(12) United States Patent
Hussein et al.

(10) Patent No.: US 12,387,730 B1
(45) Date of Patent: Aug. 12, 2025

(54) SELECTIVE ON-DEVICE LATENCY REDUCTION

(71) Applicant: Amazon Technologies, Inc., Seattle, WA (US)

(72) Inventors: Samer A. Sarhan Hussein, Rancho Santa Margarita, CA (US); Andrew Dean Christian, Lincoln, MA (US); Zenon Harley, Waterloo (CA); Matthew Williams, Coquitlam (CA); Kent V Lam, Diamond Bar, CA (US); Sergii Kovba, Bulverde, TX (US); Mark Lawrence, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 258 days.

(21) Appl. No.: 18/201,594

(22) Filed: May 24, 2023

(51) Int. Cl.
*G10L 15/30* (2013.01)
*G10L 15/22* (2006.01)

(52) U.S. Cl.
CPC .............. *G10L 15/30* (2013.01); *G10L 15/22* (2013.01); *G10L 2015/223* (2013.01)

(58) Field of Classification Search
USPC ........................................... 704/1–504
See application file for complete search history.

(56) References Cited

U.S. PATENT DOCUMENTS

| | | | |
|---|---|---|---|
| 12,047,623 B1* | 7/2024 | Zhao | H04N 21/251 |
| 12,254,578 B1* | 3/2025 | Dessureaux | G06F 3/011 |
| 2003/0216919 A1* | 11/2003 | Roushar | G06F 40/284 704/260 |
| 2020/0403929 A1* | 12/2020 | Swaminathan | G06Q 50/01 |
| 2021/0249006 A1* | 8/2021 | Bromand | H04R 1/245 |

* cited by examiner

*Primary Examiner* — Marcus T Riley
(74) *Attorney, Agent, or Firm* — Eversheds Sutherland (US) LLP

(57) ABSTRACT

Systems and methods for selective on-device latency reduction include receiving data requesting that an application associated with a user device be utilized and identifying on-device functionality enabled for the application. Data may be generated that includes a subset of content associated with the on-device functionality and is configured to be utilized by a device in the environment to perform the on-device functionality. This data may be sent to the device in question and may configure the device to process input data associated with the on-device functionality and utilize commands associated with the subset of content based at least in part on processing the input data with the on-device functionality.

20 Claims, 10 Drawing Sheets

700

Receive, from first user device in communication with second user device, first data requesting that application associated with second user device be readied for processing requests from first user device
702

Determine that application has been configured to send first command to first user device that causes first user device to respond to requests
704

In response to application being configured to send first command, generating second data that: includes subset of content associated with first command, application associated with additional content that differs from subset of content; and is configured to be utilized by first user device to utilize first command and subset of content to respond to requests
706

Send second data to first user device such that first user device is enabled to utilize second data for: processing user input data associated with first command; and sending directive associated with subset of content to second user device based at least in part on processing user input data utilizing first command
708

FIG. 7

SELECTIVE ON-DEVICE LATENCY REDUCTION

BACKGROUND

Devices, including voice interface device, have become available. Some of these devices may be utilized to perform actions in environments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example process for selective on-device latency reduction.

DETAILED DESCRIPTION

Figure 1:
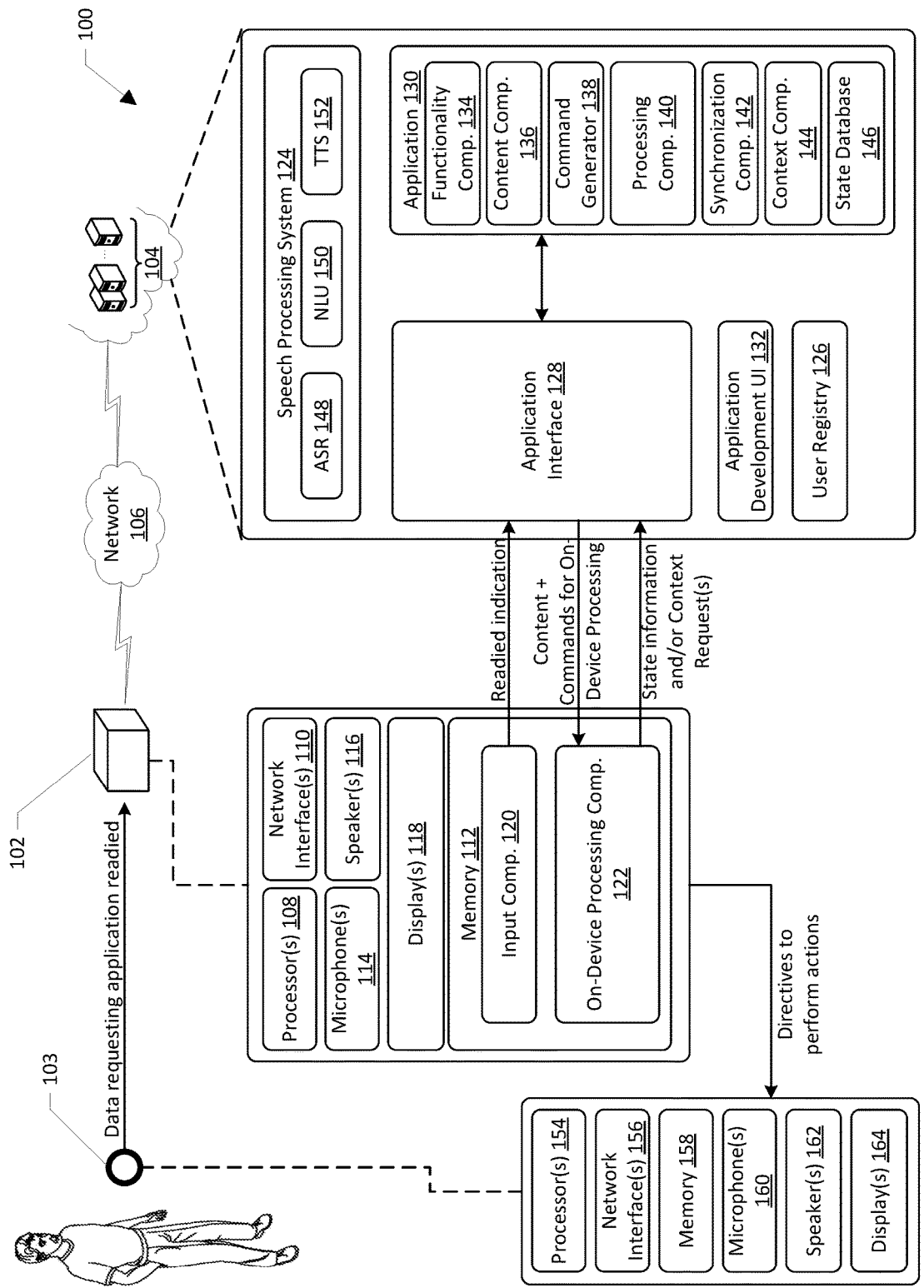
FIG. 1 illustrates a schematic diagram of an example environment for selective on-device latency reduction.

Systems and methods for selective on-device latency reduction are disclosed, among other things. Take, for example, an environment (such as a home, hotel, vehicle, office, store, restaurant, or other space) where one or more users may be present. The environments may include one or more electronic devices that may be utilized by the users or may otherwise be utilized to detect and/or control conditions associated with the environments. For example, the electronic devices may include voice interface devices (e.g., smart speaker devices, mobile phones, tablets, personal computers, televisions, appliances like refrigerators and microwaves, etc.), graphical interface devices (e.g., televisions, set top boxes, virtual/augmented reality headsets, etc.), wearable devices (e.g., smart watch, earbuds, healthcare devices), transportation devices (e.g., cars, bicycles, scooters, etc.), televisions and/or monitors, smart thermostats, security systems (including motion sensors and open/close sensors, including sensors that indicate whether a security system is armed, disarmed, or in a "home mode"), smart cameras (e.g., home security cameras), and/or touch interface devices (tablets, phones, steering wheels, laptops, kiosks, billboard, other devices with buttons, etc.). These electronic devices may be situated in a home, in a place of business, healthcare facility (e.g., hospital, doctor's office, pharmacy, etc.), in a vehicle (e.g., airplane, truck, car, bus, etc.) in a public forum (e.g., shopping center, store, etc.), and/or at a hotel/quasi-public area, for example.

In these and other scenarios, the electronic devices may generally be configured to receive user input, such as user utterances and/or input received at a graphical user interface. In examples, user input data may be sent to remote component(s) of a system associated with at least some of the electronic devices and the remote component(s) of the system may determine how to respond to the user input data. Utilizing a first user device as an example, the first user device may be a multi-modal device or otherwise may be configured to receive user input in multiple ways, such as by a touchscreen and/or by capturing audio representing user utterances. The first user device may receive this user input and may generate corresponding user input data that may be sent to other components of the system. Upon receiving the user input data, it may be processed to determine what action is to be performed by the first user device and/or another user device associated with the first user device in response to the user input data.

The remote component(s) of the system, having processed the user input data, may determine an application to utilize to respond to the user input data. For example, the system may be associated with multiple applications, with individual ones of the applications being configured to perform certain actions in response to certain user input data. Just by way of example, the applications (which may otherwise be described herein as skills) may be configured to perform actions associated with the output of music, the playing of games, causing light shows or otherwise light output to occur, displaying photographs, playing movies, etc. Given the potentially diverse array of applications and/or application-related actions, the system may utilize an application interface to determine which of the applications should be called to respond to the user input data.

Utilizing the systems and methods described herein, at least a portion of the functionality of the application at issue may be enabled for on-device processing instead of being performed entirely by processing performed on a device other than the first user device. Doing so may reduce latency between receipt of user input and performance of an action responsive to that user input at least because the device that received the user input may then be configured to utilize on-device processing functionality to determine the action, instead of always sending user input data to the remote component(s) of the system and waiting for the remote component(s) to provide a response indicating the action to be performed. When remote component(s) of the system are described herein, those remote component(s) may be components that are separate from the components of the first user device and may include system components in the same room and on the same person as at least one of the user devices and/or any other devices and/or environments, such as in another room of the same building, in an associated building, on one or more remote servers, etc.

To do so, the remote component(s) of the system may determine when a trigger event has occurred that indicates a given application will be utilized. Such trigger events may include, for example, receiving user input data requesting that the application be readied or otherwise initiated for use, determining that historical data indicates the application will be used at a certain time and/or day, detecting an environmental condition in an environment where the first user device and/or a second user device are disposed such as detection of user presence, detection of a particular user, detection of the second user device in proximity to the first user device, etc. When such a trigger event is detected, the remote component(s) of the system may determine the application to be utilized and may determine if the application has been enabled for on-device processing functionality.

To enable on-device processing functionality, a developer of the application may utilize an application development user interface of the remote component(s) of the system to provide user input data on which functionalities of the application should be configured for on-device processing. To do so, the developer of the application may provide user input data indicating the type of functionalities to be performed on the devices in question as well as the trigger events for those functionalities to be performed. Just by way of example, the user input data by the developer may indicate that an animation sequence is to be performed by the second user device when selection of a given user interface element displayed on the first user device occurs. The application development user interface may utilize these user input data from the developer to determine what command(s) are to be utilized by the first user device and/or the second user device to perform the indicated action as well as content that is to be utilized by the first user device and/or the second user device to perform the action.

Returning to when a trigger event is detected that indicates initiation of the application in question, the remote component(s) of the system may determine that the application is enabled for on-device processing functionality and may request, from the application, data to be utilized by the first user device and/or the second user device to perform the on-device processing functionality. This data may include a subset of the content configured to be rendered by the application such as image data, audio data, etc. that is associated with the on-device processing functionality. The data to be utilized by the first user device may also include commands to be utilized by the first user device and/or the second user device for performing actions when the on-device processing functionality indicates such actions are to be performed. In this example, the on-device processing functionality represents content and commands that may be utilized by the first user device to perform operations that would otherwise be performed by remote component(s) of the system utilizing the application, while other operations that are not associated with the content and/or commands may be performed by the remote component(s) of the system utilizing the application. In examples, the on-device processing functionality may correspond to the content and commands that the developer of the application has enabled for such on-device processing functionality. Additionally, or alternatively, the on-device processing functionality may correspond to content and commands that do not utilize time sensitive information determinations. For example, a good candidate for on-device processing functionality may be content and commands that do not require time sensitive information to be utilized when determining the appropriate response to the user input in question. As such, on-device processing functionality may be appropriate for user requests such as "play Video A," "show me Photograph B," "let's play Game C," etc. However, functionality performed by remote component(s) of the system utilizing the application may be more appropriate for user requests such as "make a reservation at Restaurant D," "what's the current score of Basketball Game E," and/or other requests where other systems and/or databases are to be called to determine time sensitive information for accurately responding to the user request at issue.

Once the on-device processing functionality is determined and the content and commands for performing the on-device processing functionality is generated, the remote component(s) of the system may send the commands and/or content to the first user device and/or the second user device. By so doing, the commands and/or content for on-device processing may be preloaded on the first user device and/or the second user device such that when subsequent user input data is received indicating an interaction associated with the application, the first user device and/or the second user device may utilize the commands and/or content to determine whether the user input data can be processed utilizing the on-device processing. When the on-device processing can be utilized, the first user device and/or the second user device may process the user input data locally, determine the action to be performed, and utilize the preloaded commands and/or the subset of content preloaded on the device in question to perform the action. Even in examples where the on-device processing is not to be utilized to perform all of the processing associated with given user input data, the on-device processing may be utilized to perform at least a portion of the processing and then a remaining portion of the processing for which the application is needed may be performed by the remote component(s) of the system utilizing the application. In these examples, the on-device processing may result in determining to request contextual information from the remote component(s) of the system such that a response to the user input can be determined, and the application may be utilized to retrieve the contextual information and to provide the contextual information to the first user device and/or the second user device such that the first user device may utilize the contextual information to determine the action to be performed. By so doing, while the application may still be involved in performing the processing described herein, that processing may be minimized.

To illustrate the on-device processing functionality described above, such on-device processing may be associated with synchronized output of audio with the performance of other actions by the first user device and/or the second user device. Synchronizing output of audio with other actions may be difficult to perform when latency is introduced by the sending and receipt of data by the first user device and by utilizing the remote component(s) of the system. As such, when synchronization processes are enabled for on-device processing, the synchronization between the output of audio and the corresponding device actions may be improved such that user perceived latency is reduced and/or eliminated.

In addition to the above, the on-device processing functionality may include device identification mapping to allow the application and the first user device to send and receive data about a given user device in a secure manner. For example, the remote component(s) of the system may be configured to map serial numbers or other identifiers provided by the second user devices to device identifiers generated by the remote component(s) of the system to randomize or otherwise protect the serial numbers from being transmitted during processing. This may promote the secure exchange of information and decrease the chances of a nefarious actor obtaining device serial numbers of the second user devices. However, given that the on-device processing is to be performed for at least a portion of the user input received in association with a given application, this device mapping may be instead performed by the first user device, and the first user device may utilize its generated device identifiers for communicating with the application.

Additionally, even though the on-device processing may be utilized to process certain user inputs associated with use of a given application, the first user device and/or the second user device may send data to the application after the on-device processing is utilized indicating what on-device processing occurred and/or how that on-device processing changed attributes of the second user device(s) at issue, including state changes of the second user device(s), for example. This may allow the application to accurately determine user device states and/or other attributes of user device(s) even when the remote component(s) of the system are not utilized to perform the second user device state changes.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for selective on-device latency reduction. The environment 100 may include, for example, a first user device 102 (also described herein as voice enabled devices and/or voice interface devices in examples) and one or more user devices 103 (also described herein as connected devices and/or auxiliary devices). In certain examples, the devices 102 and 103 themselves may be any one or more of a voice enabled device (e.g., smart speaker devices, mobile phones, tablets, personal computers, etc.), a video interface device (e.g., televisions, set top boxes, virtual/augmented reality headsets, etc.), and/or a touch interface device (tablets, phones, laptops, kiosks, billboard, etc.). In some examples, the devices may be situated in a home, place of business, healthcare facility (e.g., hospital, doctor's office, pharmacy, etc.), in a vehicle (e.g., airplane, truck, car, bus, etc.), and/or in a public forum (e.g., shopping center, store, hotel, etc.), for example. In some nonlimiting examples, the first user device 102 may be a multi-modal device that may be configured to capture audio representing user utterances and/or to capture user input by a display or otherwise. The second user device 103 may be a device that is associated with the first user device 102, such as wearable devices, personal devices such as phones, a vehicle; or smart devices such as smart home devices, portable devices, and/or any other device that may be associated with the first user device 102.

The devices 102 and 103 may be configured to send data to and/or receive data from a remote component(s) of the system 104, such as via a network 106. It should be understood that where operations are described herein as being performed by the remote component(s) of the system 104, some or all of those operations may be performed by the devices 102 and 103. It should also be understood that anytime the remote component(s) of the system 104 is referenced, that system may include any system and/or device, whether local to an environment of the devices or remote from that environment. Additionally, it should be understood that a given space and/or environment may include numerous devices. It should also be understood that when a "space" or "environment" is used herein, those terms mean an area of any size and delineation and can include but are not necessarily limited to a given room, building, or other structure, unless otherwise specifically described as such.

The first user device 102 may include one or more components, such as, for example, one or more processors 108, one or more network interfaces 110, memory 112, one or more microphones 114, one or more speakers 116, and/or one or more displays 118. The microphones 114 may be configured to capture audio, such as user utterances, and generate corresponding audio data. The speakers 116 may be configured to output audio, such as audio corresponding to audio data received from another device. The displays 118 may be configured to display images corresponding to image data, such as image data received from the remote component(s) of the system 104 as well as user interface elements that may be configured to receive user input indicating selection of such user interface elements. The first user device 102 may be configured to detect an environmental condition associated with the second user device 103 and/or the environment associated with the second user device 103. Some example sensors that may be utilized to detect conditions may include one or more microphones configured to capture audio associated with the environment in which the device is located, one or more cameras configured to capture images associated with the environment in which the device is located, one or more network interfaces configured to identify network access points associated with the environment, global positioning system components configured to identify a geographic location of the devices, Bluetooth and/or other short-range communication components configured to determine what devices are wirelessly connected to the device, device-connection sensors configured to determine what devices are physically connected to the device, user biometric sensors, and/or one or more other sensors configured to detect a physical condition of the device and/or the environment in which the device is situated. In addition to specific environmental conditions that are detectable by the sensors, usage data and/or account data may be utilized to determine if an environmental condition is present. In some examples, the sensors may also include radar and/or ultrasonic sensors. The memory 112 may include an input component 120 and/or an on-device processing component 122. The components of the memory 112 will be described in more detail below.

The second user device 103 may include one or more components, such as, for example, one or more processors 154, one or more network interfaces 156, memory 158, one or more microphones 160, one or more speakers 162, and/or one or more displays 164. The microphones 160 may be configured to capture audio, such as user utterances, and generate corresponding audio data. The speakers 162 may be configured to output audio, such as audio corresponding to audio data received from another device. The displays 164 may be configured to display images corresponding to image data, such as image data received from the remote component(s) of the system 104 as well as user interface elements that may be configured to receive user input indicating selection of such user interface elements.

It should be understood that while several examples used herein include a voice-enabled device that allows users to interact therewith via user utterances, one or more other devices, which may not include a voice interface, may be utilized instead of or in addition to voice-enabled devices. In these examples, the device 102 may be configured to send and receive data over the network 106 and to communicate with other devices in the environment 100. As such, in each instance where a voice-enabled device is utilized, a computing device that does not include a voice interface may also or alternatively be used. It should be understood that when voice-enabled devices are described herein, those voice-enabled devices may include phones, computers, and/or other computing devices.

The remote component(s) of the system 104 may include components such as, for example, a speech processing system 124, a user registry 126, an application interface 128, an application 130, and/or an application development user interface 132. The application 130 may include components such as, for example, a functionality component 134, a content component 136, a command generator 138, a processing component 140, a synchronization component 142, a context component 144, and/or a state database 146. It should be understood that while the components of the remote component(s) of the system 104 are depicted and/or described as separate from each other in FIG. 1, some or all of the components may be a part of the same system. The speech processing system 124 may include an automatic speech recognition component (ASR) 148, a natural language understanding component (NLU) 150, and/or a text to speech (TTS) component 152. Each of the components described herein with respect to the remote component(s) of the system 104 may be associated with their own systems, which collectively may be referred to herein as the remote component(s) of the system 104, and/or some or all of the components may be associated with a single system. Additionally, the remote component(s) of the system 104 may include the one or more applications 130, which may be described as skills. "Skills," as described herein may be applications and/or may be a subset of an application. For example, a skill may receive data representing an intent. For example, an intent may be determined by the NLU component 150 and/or as determined from user input via a computing device. Skills may be configured to utilize the intent to output data for input to the TTS component 152, a link or other resource locator for audio data, and/or a command to a device, such as the smart devices. "Skills" may include applications running on devices, such as the smart devices, and/or may include portions that interface with voice user interfaces of smart devices.

In instances where a voice-enabled device is utilized, skills may extend the functionality of smart devices that can be controlled by users utilizing a voice-user interface. In some examples, skills may be a type of application that may be useable in association with target devices and may have been developed specifically to work in connection with given target devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device and send data and/or instructions associated with the input to one or more other devices.

Additionally, the operations and/or functionalities associated with and/or described with respect to the components of the remote component(s) of the system 104 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

With respect to the remote component(s) of the system 104, the user registry 126 may be configured to determine and/or generate associations between users, user accounts, environment identifiers, and/or devices. For example, one or more associations between user accounts may be identified, determined, and/or generated by the user registry 126. The user registry 126 may additionally store information indicating one or more applications and/or resources accessible to and/or enabled for a given user account. Additionally, the user registry 126 may include information indicating device identifiers, such as naming identifiers, associated with a given user account, as well as device types associated with the device identifiers. The user registry 126 may also include information indicating user account identifiers, naming indicators of devices associated with user accounts, and/or associations between devices, such as the smart devices. The user registry 126 may also include information associated with usage of the smart devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the environment 100 may be stored or otherwise associated with an account identifier. Data associated with the user accounts may include, for example, account access information, historical usage data, device-association data, and/or preference data. The user registry 126 may also include data indicating which applications 130 are associated with on-device processing functionality and/or what on-device processing functionality is associated with given applications 130.

The speech-processing system 124 may be configured to receive audio data from the first user device 102 and/or other devices and perform speech-processing operations. For example, the ASR component 148 may be configured to generate text data corresponding to the audio data, and the NLU component 150 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component 150 may identify a "play" intent. In this example where the intent data indicates an intent to output audio and/or images associated with Video A, the speech processing system 124 may call one or more applications 130 to effectuate the intent. Skills, as described herein may otherwise be described as applications and may include functionality for utilizing intent data to generate directives and/or instructions.

The components of the environment 100 are described below by way of example. To illustrate, absent the innovations described herein, all or essentially all of the functionality for responding to user input data received on the first user device 102 and/or the second user device 103 may be performed utilizing the application 130 at issue such that when user input data is received from the first user device 102 and/or the second user device 103, corresponding user input data may be sent to the remote component(s) of the system 104, processed by the processing component 140, a response determined by the application 130 at issue, and data sent back to the first user device 102 and/or the second user device 103 for use by those devices 102 and 103 to perform an action. However, utilizing the systems and methods described herein, at least a portion of the functionality of the application 130 may be enabled for on-device processing by the on-device processing component 122 instead of that processing being performed by the application 130 utilizing the processing component 140. Doing so may reduce latency between receipt of user input and performance of an action responsive to that user input at least because the device 102 and 103 that received the user input may then be configured to utilize on-device processing functionality to determine the action, instead of sending user input data to the remote component(s) of the system 104 and waiting for the remote component(s) of the system 104 to provide a response indicating the action to be performed.

To do so, the input component 120 of the first user device 102 and/or the second user device 103 may receive user input data or otherwise receive contextual data indicating that a trigger event has occurred in association with one or more applications 130. These trigger events may indicate that a given application will be readied and/or otherwise utilized. Such trigger events may include, for example, receiving user input data requesting that the application 130 be readied or otherwise initiated for use, determining that historical data indicates the application 130 will be used at a certain time and/or day, detecting an environmental condition in an environment where the first user device 102 and/or the second user device 103 are disposed such as detection of user presence, detection of a particular user, detection of the second user device 103 in proximity to the first user device 102, etc. It should be understood that the trigger events provided herein are provided by way of nonlimiting example, and any trigger events that indicate interaction with a given application 130 may be utilized. The input component 120 may utilize the data described above to determine that a trigger event has occurred and/or the input component 120 may be configured to receive the data described above and send that data to the remote component(s) of the system 104. In these examples, the application interface 128 may receive the data from the input component 120 and may perform operations to determine that a readied indication or otherwise a trigger event associated with a given application 130 has occurred. When such a trigger event is detected, the application interface 128 may determine the application 130 to be utilized and may determine if the application 130 has been enabled for on-device processing functionality.

To enable on-device processing functionality, a developer of the application 130 may utilize the application development user interface 132 to provide user input data on which functionalities of the application 130 should be configured for on-device processing. To do so, the developer of the application 130 may provide user input data indicating the type of functionalities to be performed on the devices in question as well as the trigger events for those functionalities to be performed. Just by way of example, the user input data by the developer may indicate that an animation sequence is to be performed by the second user device when selection of a given user interface element displayed on the first user device 102 occurs. Other example actions may include output of certain content when certain user gestures are detected, causing the second user device 103 to vibrate when certain images are displayed on the first user device 102, causing the second user device 103 to light up at certain points of a game, etc. The application development user interface 132 may utilize these user input data from the developer to determine what command(s) are to be utilized by the first user device 102 and/or the second user device 103 to perform the indicated action as well as content that is to be utilized by the first user device 102 and/or the second user device 103 to perform the action.

Returning to when a trigger event is detected that indicates initiation of the application in question, the application 130 may be queried to determine if on-device processing functionality is available for the application 130. Specifically, the functionality component 134 of the application 130 may receive an indication that a trigger event has been detected for the application 130 and may determine if on-device processing functionality is available. When on-device processing functionality is available, the functionality component 134 may determine which commands associated with the application 130 are associated with on-device processing. In examples, the on-device processing functionality may be the portion of the overall functionality that the developer of the application 130 has enabled for such on-device processing functionality. Additionally, or alternatively, the on-device processing functionality may be functionality that does not utilize time sensitive information determinations. For example, a good candidate for on-device processing functionality may be functionality that does not require time sensitive information to be utilized when determining the appropriate response to the user input in question. As such, on-device processing functionality may be appropriate for user requests such as "play Video A," "show me Photograph B," "let's play Game C," etc. However, commands to be utilized by remote component(s) of the system 104 may be more appropriate for user requests such as "make a reservation at Restaurant D," "what's the current score of Basketball Game E," and/or other requests where other systems and/or databases are to be called to determine time sensitive information for accurately responding to the user request at issue.

Once the on-device processing functionality is determined by the functionality component 134, the functionality component 134 may query the content component 136 for content associated with the on-device processing functionality. For example, the content component 136 may store data representing content to be utilized when responding to user input utilizing the application 130. By way of example, if the application 130 at issue is a gaming application, the content component 136 may store content including images to be displayed as part of the game to be played, audio to be output as part of the game, light and/or animation sequences to be output as part of the game, etc. At least a subset of this content may be associated with the on-device processing functionality, while other portions of the content may be associated with the functionality to be performed by the remote component(s) of the system 104. When called by the functionality component 134, the content component 136 may retrieve the subset of the content associated with the on-device processing functionality and may provide the subset of content to the functionality component 134.

Additionally, the functionality component 134 may call the command generator 138 for data representing one or more commands associated with the on-device processing functionality. For example, the application 130 may be configured to process user input data and to generate commands for the first user device 102 and/or the second user device 103 to perform actions responsive to those user input data. Utilizing the gaming application example, the commands may be to output certain content when certain user input data is received, to display instructions for playing the game, to cause user devices 103 to vibrate at certain portions of the game, etc. As with the content described above, some of these commands may be associated with the on-device processing functionality while other commands may be associated with processing performed by the remote component(s) of the system 104. The command generator 138, when called by the functionality component 134, may send data representing the commands associated with the on-device processing functionality to the functionality component 134.

In addition to the above, in examples, the functionality of the application 130 may include the synchronized output of audio with performance of other actions by the first user device 102 and/or the second user device 103. When the functionality includes such synchronized output, the functionality component 134 may query the synchronization component 142 for data that may be utilized by the first user device 102 and/or the second user device 103 to synchronize output of audio with performance of other actions by the first user device 102 and/or the second user device 103. The data maintained by the synchronization component 142 may include data that associates frames of image data and/or identifiers of actions with portions of audio data such that the portions of the audio data are indicated to be output when the frames of the image data are output and/or when the actions are performed. This synchronization data may be sent from the synchronization component 142 to the functionality component 134.

Additionally, while the functionality component 134 may be involved in determining initial commands and/or content subsets to be provided for on-device processing functionality, the functionality component 134 may also be configured to update these commands and/or content subsets when changes are detected that merit such updating. For example, the functionality component 134 may determine that the subset of content has changed to alternate content after the initial configuration data is sent to the first user device 102 and/or the second user device 103. The functionality component 134 may generate, based at least in part on the on-device functionality being enabled, configuration data including the alternate content and second commands associated with the alternate content, and this new configuration data may be sent to the first user device 102 and/or the second user device 103. The first user device 102 and/or the second user device 103 may utilize the new configuration data instead of the at least a portion of the initial configuration data for performing on-device processing functionality.

The functionality component 134, having received the subset of content associated with on-device processing functionality, commands associated with on-device processing functionality, and/or synchronization data associated with on-device processing functionality may generate configuration data that includes the subset of content, the commands, and/or the synchronization data. In examples, this configuration data may be sent in the form of a programming language document and in association with a programming language interface. The programming language document may include a JSON file or otherwise a file with the configuration data, and the first user device 102 and/or the second user device 103 may be configured to utilize the programming language document to identify what processes can be performed utilizing on-device processing functionality. In examples, the configuration data itself may be a set of rules, conditional statements, models, and/or other logic for determining what actions to perform when certain user inputs and/or conditions are detected.

The application 130 may send this configuration data to the application interface 128, which may send the configuration data to the first user device 102 and/or the second user device 103 for performing the on-device processing. The configuration data may be received by the on-device functionality component 122, and by so doing the configuration data may be preloaded in the on-device processing component 122 such that when user input data is received indicating an interaction associated with the application 130, the first user device 102 and/or the second user device 103 may utilize the on-device processing to determine whether the user input data can be processed utilizing the configuration data.

For example, the input component 120 may receive user input data at some time after the configuration data has been preloaded on the on-device processing component. The input component 120 may determine whether the user input data is associated with the application 130 and/or whether the user input data is associated with on-device processing functionality. When the on-device processing functionality can be utilized, the on-device processing component 122 may process the user input data locally utilizing the configuration data, determine the action to be performed, and utilize the preloaded commands and/or the subset of content preloaded on the device 102, 103 in question to send a directive to perform the action to the second user device 103.

Even in examples where the on-device processing functionality is not to be utilized to perform all of the processing associated with given user input data, the on-device processing functionality may be utilized to perform at least a portion of the processing and then a remaining portion of the processing for which the remote component(s) of the system 104 is needed may be performed by the application 130. In these examples, the on-device processing component 122 may determine that contextual information may be utilized to respond to the user input in question. For example, the user input may indicate a request for additional information about an image displayed on the first user device 102. The on-device processing component 122 may be configured to process this request and determine that certain audio representing a response to the request is to be output, but the on-device processing component 122 may not have received the requested information as part of the preloaded subset of content from the application 130. As such, the on-device processing component 122 may request contextual information from the application 130 such that a response to the user input can be determined. The context component 144 of the application 130 may receive the request for context information and may retrieve the contextual information. The context component 144 may then send the contextual information to the on-device processing component 122 such that the on-device processing component 122 may utilize the contextual information to determine the action to be performed. By so doing, while the application 130 may still be involved in responding to the user input, but that involvement may be minimized.

In addition to the above, the on-device processing functionality may include device identification mapping to allow the application 130 and the first user device 102 to send and receive data about a given user device 103 in a secure manner. For example, absent the innovations described herein, the remote component(s) of the system 104 may be configured to map serial numbers or other identifiers provided by the second user devices 103 themselves to device identifiers generated by the remote component(s) of the system 104 to randomize or otherwise protect the serial numbers themselves from being transmitted during processing. This may promote the secure exchange of information and decrease the chances of a nefarious actor obtaining device serial numbers of the second user devices 103. However, given that the on-device processing functionality is to be performed for a least a portion of the user input received in association with a given application 130, this device mapping may be instead performed by the first user device 102 (such as by the on-device processing component 122), and the first user device 102 may utilize its generated device identifiers for communicating with the application 130.

Additionally, even though the on-device processing functionality may be utilized to process certain user inputs associated with use of a given application 130, the first user device 102 and/or the second user device 103 may send data to the application 130 after the on-device processing functionality is utilized indicating what on-device processing occurred and/or how that on-device processing changed attributes of the second user device(s) 103 at issue, including state changes of the second user device(s) 103, for example. The state database 146 may store the data associated with the on-device processing functionality such that the application 130 may accurately determine user device states and/or other attributes of user device(s) 103 even when the remote component(s) of the system 104 are not utilized to perform the second user device state changes.

As used herein, the one or more processes performed by the application 130 and/or the on-device processing component 122 may include the user of models. These models may be machine learning models. For example, the machine learning models as described herein may include predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models described herein. Those techniques may include, for example, decision tree learning, association rule learning, artificial neural networks (including, for example, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

As described herein, the machine learning models may be configured to be trained utilizing a training dataset associated with prior user input data. The models may be trained for multiple user accounts and/or for a specific user account. As such, the machine learning models may be configured to learn, without human intervention, attributes of collected data and/or actions taken associated with device usage cessation.

It should be noted that while text data is described as a type of data utilized to communicate between various components of the remote component(s) of the system 104 and/or other systems and/or devices, the components of the remote component(s) of the system 104 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices.

As shown in FIG. 1, several of the remote component(s) of the system 104 and the associated functionality of those components as described herein may be performed by one or more of the devices 102 and 103. Additionally, or alternatively, some or all of the components and/or functionalities associated with the devices 102, 103 may be performed by the remote component(s) of the system 104.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 108 and/or the processor(s) described with respect to the components of the system 104, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or the processor(s) described with respect to the components of the system 104 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or the processor(s) described with respect to the components of the system 104 may possess its own local memory, which also may store program components, program data, and/or one or more operating systems.

The memory 112 and/or the memory described with respect to the components of the system 104 may include volatile and nonvolatile memory, removable and non-removable media implemented in any method or technology for storage of information, such as computer-readable instructions, data structures, program component, or other data. Such memory 112 and/or the memory described with respect to the components of the system 104 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or the memory described with respect to the components of the system 104 may be implemented as computer-readable storage media ("CRSM"), which may be any available physical media accessible by the processor(s) 108 and/or the processor(s) described with respect to the system 104 to execute instructions stored on the memory 112 and/or the memory described with respect to the components of the system 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or the memory described with respect to the components of the system 104, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or the network interface(s) described with respect to the components of the system 104 may enable messages between the components and/or devices shown in environment 100 and/or with one or more other polling systems, as well as other networked devices. Such network interface(s) 110 and/or the network interface(s) described with respect to the components of the system 104 may include one or more network interface controllers (NICs) or other types of transceiver devices to send and receive messages over the network 106.

For instance, each of the network interface(s) 110 and/or the network interface(s) described with respect to the components of the system 104 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or the network interface(s) described with respect to the components of the system 104 may include a wide area network (WAN) component to enable message over a wide area network.

In some instances, the remote component(s) of the system 104 may be local to an environment associated with the devices. For instance, the remote component(s) of the system 104 may be located within one or more of the first user devices 102 and/or the smart devices. In some instances, some or all of the functionality of the remote component(s) of the system 104 may be performed by one or more of the devices. Also, while various components of the system 104 have been labeled and named in this disclosure and each component has been described as being configured to cause the processor(s) to perform certain operations, it should be understood that the described operations may be performed by some or all of the components and/or other components not specifically illustrated. It should be understood that, in addition to the above, some or all of the operations described herein may be performed on a phone or other mobile device and/or on a device local to the environment, such as, for example, a hub device and/or edge server in a home and/or office environment, a self-driving automobile, a bus, an airplane, a camper, a trailer, and/or other similar object having a computer to perform its own sensor processing, etc.

Figure 2:
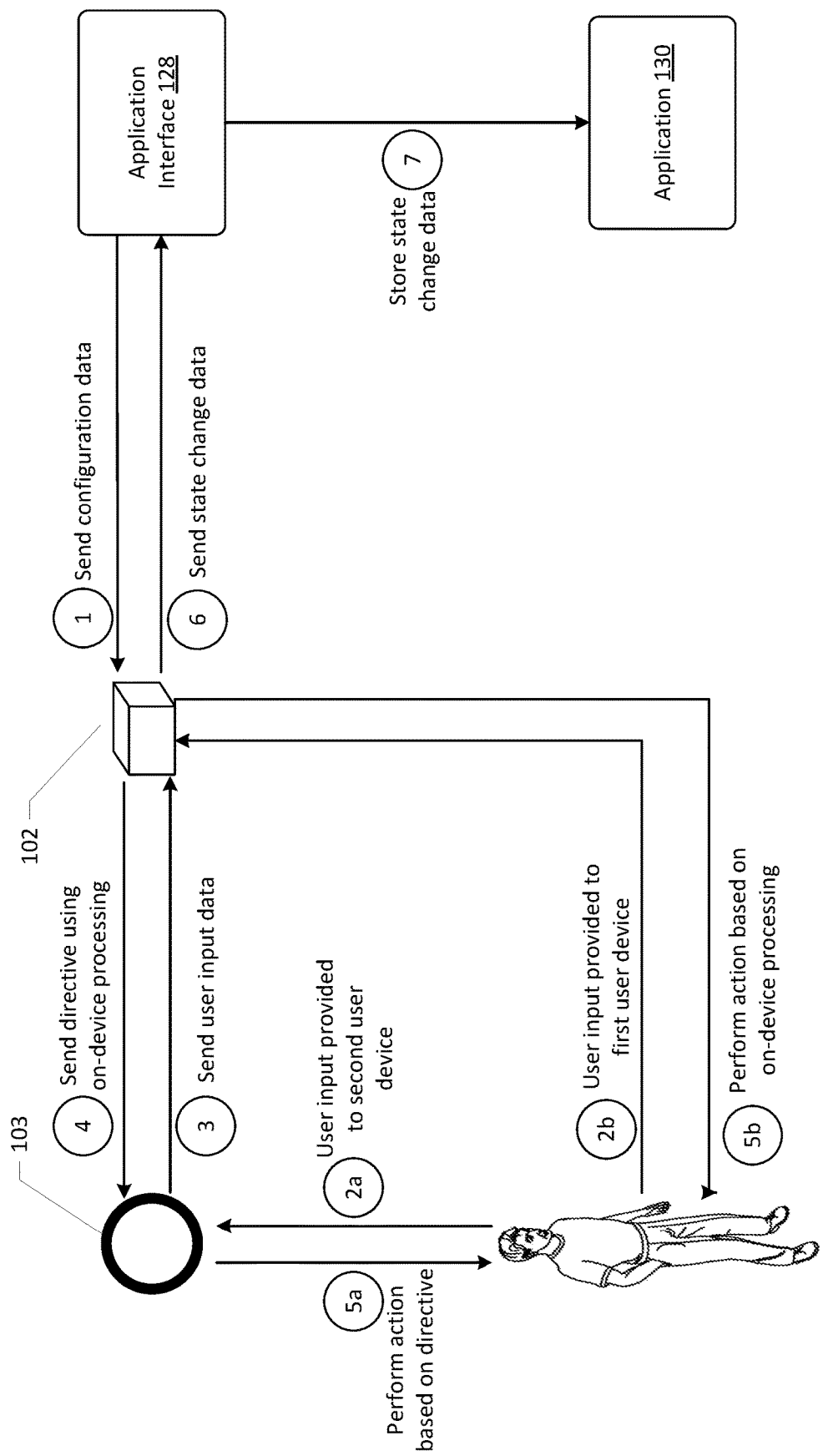
FIG. 2 illustrates a conceptual diagram of example components utilized for selective on-device latency reduction.

FIG. 2 illustrates a conceptual diagram of example components utilized for selective on-device latency reduction. The components of FIG. 2 may be the same or similar to the components described with respect to FIG. 1. For example, FIG. 2 may include a first user device 102, a second user device 103, an application interface 128, and/or an application 130. The operations described with respect to FIG. 2 are illustrated by way of steps 1-7. However, it should be understood that the operations may include more or less than seven steps and/or the steps may be performed in a different order than illustrated in FIG. 2 and/or some or all of the steps may be performed in parallel with each other.

At step 1, the application interface 128 may send configuration data to the first user device 102. As described above, the remote component(s) of the system described herein may determine a subset of content associated with on-device processing functionality, commands associated with on-device processing functionality, and/or synchronization data associated with on-device processing functionality. The remote component(s) of the system may generate configuration data that includes the subset of content, the commands, and/or the synchronization data. In examples, this configuration data may be sent in the form of a programming language document and in association with a programming language interface. The programming language document may include a JSON file or otherwise a file with the configuration data, and the first user device 102 may be configured to utilize the programming language document to identify what processes can be performed utilizing on-device processing functionality. In examples, the configuration data itself may be a set of rules, conditional statements, models, and/or other logic for determining what actions to perform when certain user inputs and/or conditions are detected.

The configuration data may be received by an on-device functionality component of the first user device 102, and by so doing the on-device processing functionality may be preloaded in the on-device processing component such that when user input data is received indicating an interaction associated with the application 130, the first user device 102 may utilize the on-device processing functionality to determine whether the user input data can be processed utilizing the on-device processing functionality.

At step 2*a*, the user may provide user input to the second user device 103. In examples, the user input may be a user utterance, a tap or other tactile input received at the second user device 103, a gesture and/or otherwise a movement detected by the second user device 103, and/or any other input type that is detected by the second user device 103. The second user device 103 may detect the user input and may generate user input data that corresponds to the user input. The user input data may indicate the type of user input that was received and/or data associated with the user input, such as what portions of the second user device 103 the user interacted with, what user interface elements were interacted with in instances where the second user device 103 is configured to display a user interface, an identification of the gesture that was detected when the user input is associated with a gesture, etc.

At step 3, the second user device 103 may send the user input data to the first user device 102. At this point, the first user device, and particularly an input component of the voice interface 102, may be configured to receive the user input data and determine whether the user input data is associated with functionality of the application 130 or is associated with some other functionality of the remote component(s) of the system described herein and/or the first user device 102. In examples where the user input data is determined to be associated with the application 130, the first user device 102 may determine whether the on-device processing functionality can be utilized to process the user input data. As described in more detail above, the on-device processing component of the first user device 102 may utilize the configuration data to determine if the type of user input data is associated with on-device processing functionality or whether the user input data should be processed by the application 130.

At step 4, when the on-device processing functionality may be utilized to process the user input data, the on-device processing component may process the user input data and may determine what action is to be performed by the first user device and/or the second user device 103 in response to the user input data. In examples, at least a portion of the actions to be performed may be associated with the first user device 102, such as causing the first user device 102 to display images, output audio, cause a light element to emit light, etc. In these examples, the first user device 102 may utilize the configuration data to determine which actions are to be performed on the first user device 102 and utilize commands as indicated by the configuration data to cause the actions to be performed on the first user device 102. Additionally, or alternatively, the actions may include causing the second user device 103 to perform actions, such as causing the second user device 103 to display images, output audio, emit light, vibrate, etc. In these examples, directives may be determined utilizing the configuration data and those directives may be sent to the second user device 103.

In the above example where the user input was received from the second user device 103, at step 5*a*, the second user device 103 may perform one or more actions as directed by the first user device 102 and the second user device 103 may provide an indication that a response has been provided to the user input. By so doing, the user may receive confirmation that the request associated with the user input has been processed and an action performed.

In addition to, or instead of, the user input being received by the second user device 103, the user input may be received from the first user device at step 2*b*. The user input may take the form of the user input types described above with respect to step 2*a*, but instead of the user input being received at the second user device 103, the user input may be received at the first user device 102. The determination of on-device processing functionality may still occur, but in examples where the user input is associated with an action to be performed on the first user device 102 and not on the second user device 103, the action may be performed at step 5*b* on the first user device 102 and/or a confirmation that the user input was processed may be output by the first user device 102. By so doing, the on-device processing functionality may have been utilized to process user input data that would otherwise have been processed utilizing the application 130.

At step 6, the first user device 102 may send data to the application interface 128 indicating the on-device processing performed by the first user device 102. For example, even though the on-device processing functionality may be utilized to process certain user inputs associated with use of a given application 130, the first user device 102 may send data to the application 130 after the on-device processing functionality is utilized indicating what on-device processing occurred and/or how that on-device processing changed attributes of the second user device(s) 103 at issue, including state changes of the second user device(s) 103, for example.

At step 7, a state database associated with the application 130 may store the data associated with the on-device processing functionality such that the application 130 may accurately determine user device states and/or other attributes of user device(s) 103 even when the application 130 is not utilized to perform the second user device state changes. In examples, this data may also be utilized to refine the on-device processing functionality of the application 130 and/or to determine other functionalities that may be moved from the application 130 to on-device processing functionalities.

Figure 3:
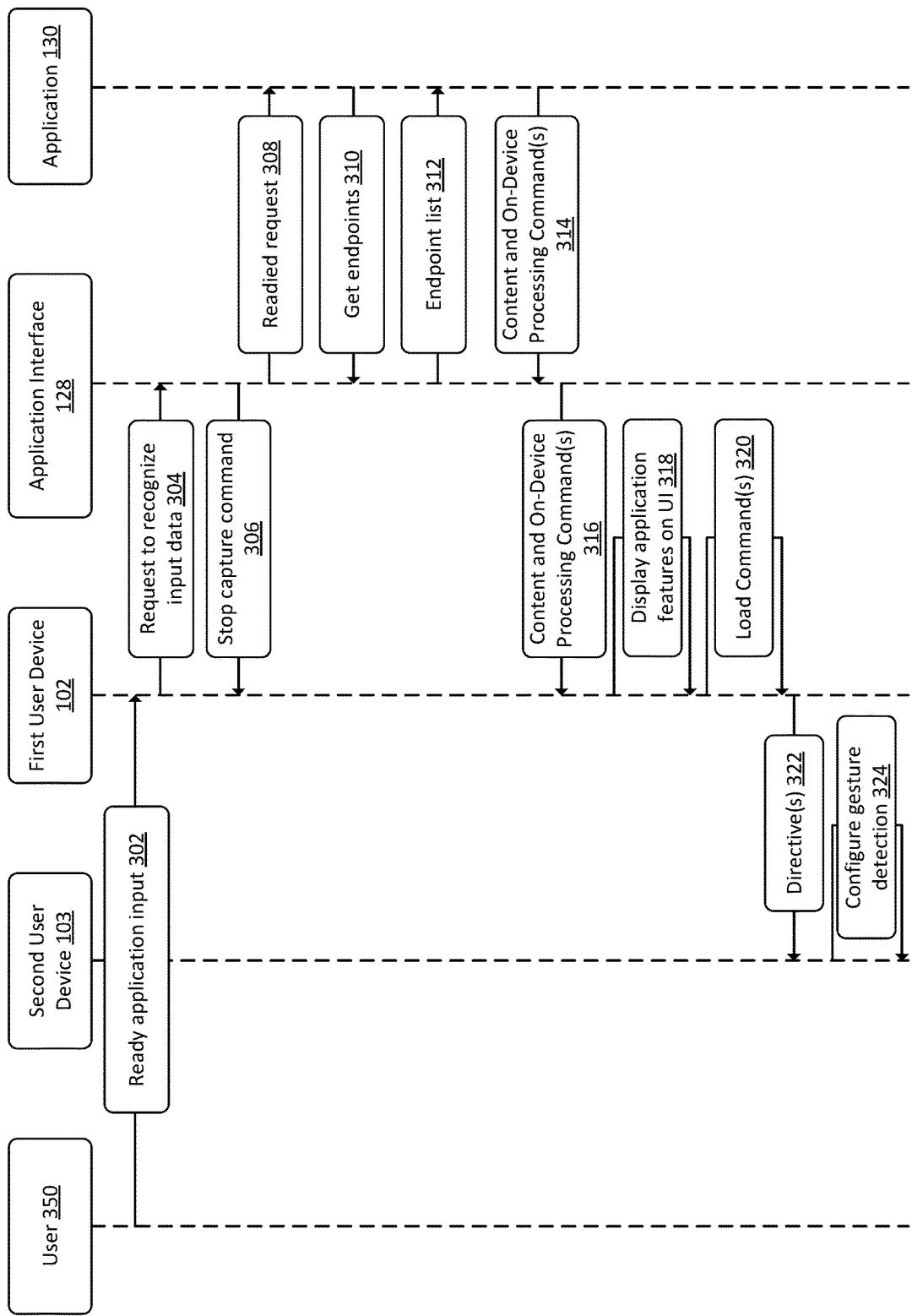
FIG. 3 illustrates a sequence diagram of an example process for providing subsets of content and configuration data to a first user device to enable on-device processing functionality.
Figure 4:
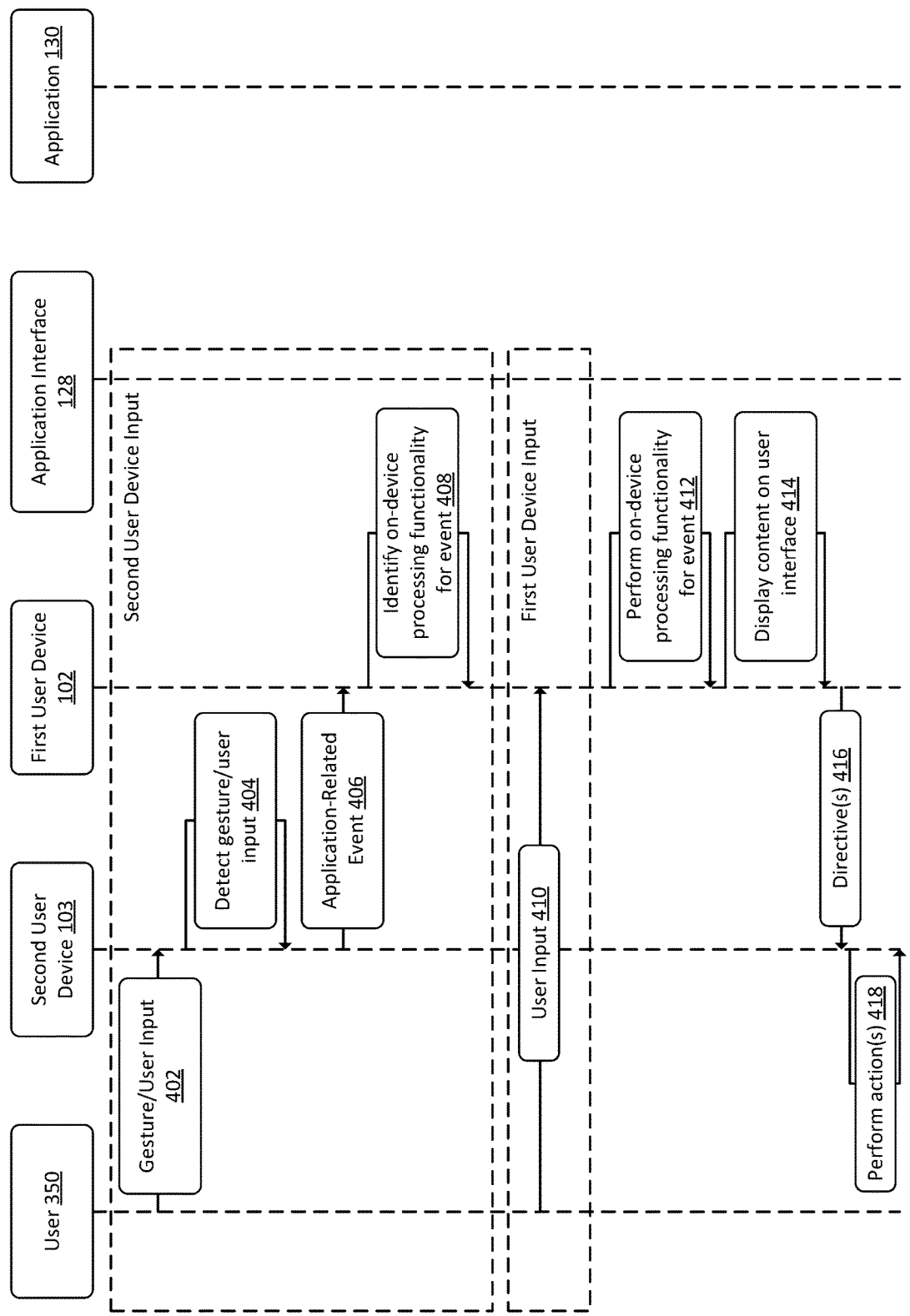
FIG. 4 illustrates a sequence diagram of an example process for utilizing on-device processing functionality for enabled trigger events.
Figure 5:
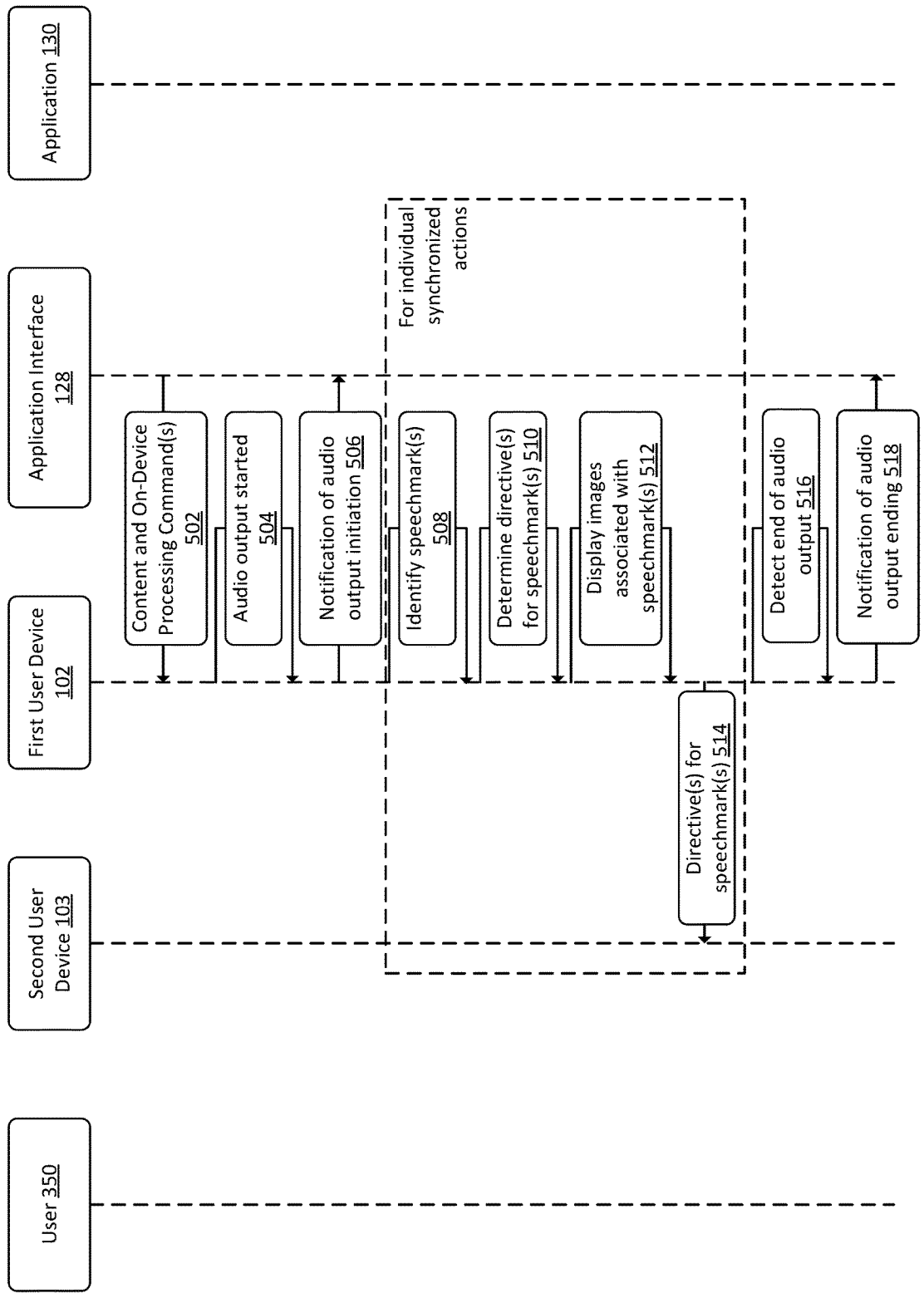
FIG. 5 illustrates a sequence diagram of an example process for synchronizing the output of audio with other actions on a device utilizing on-device processing functionality.

FIGS. 3-5 illustrates processes for selective on-device latency reduction. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1, 2, and 6-10, although the processes may be implemented in a wide variety of other environments, architectures and systems.

FIG. 3 illustrates a sequence diagram of an example process for providing subsets of content and configuration data to a first user device to enable on-device processing functionality. The operations described with respect to FIG. 3 may be performed in the order shown in FIG. 3 and/or in any other order. Additionally, at least some of the operations may be performed in parallel.

At block 302, a user 350 may provide input to the first user device 102 indicating that the application 130 is requested to be readied. For example, a input component of a first user device and/or a second user device may receive user input data or otherwise receive contextual data indicating that a trigger event has occurred in association with one or more applications. These trigger events may indicate that a given application will be utilized. Such trigger events may include, for example, receiving user input data requesting that the application be readied or otherwise initiated for use, determining that historical data indicates the application will be used at a certain time and/or day, detecting an environmental condition in an environment where the first user device and/or the second user device are disposed such as detection of user presence, detection of a particular user, detection of the second user device in proximity to the first user device, etc. It should be understood that the trigger events provided herein are provided by way of nonlimiting example, and any trigger events that indicate interaction with a given application may be utilized. The input component may utilize the data described above to determine that a trigger event has occurred and/or the input component may be configured to receive the data described above and send that data to the remote component(s) of the system. In these examples, an application interface may receive the data from the input component and may perform operations to determine that a readied indication or otherwise a trigger event associated with a given application has occurred. When such a trigger event is detected, the application interface may determine the application to be utilized and may determine if the application has been enabled for on-device processing functionality.

At block 304, the first user device 102 may send a request to recognize the input data to the application interface 128, which may be part of a remote component(s) of the system 104. In this example, the application interface 128 may receive the request to recognize the input data and may determine an application 130 for which the input data is associated. The application interface 128 may select the application 130 at issue and determine that the application 130 is to be readied for processing further input data.

At block 306, the application interface 128 may perform operations to recognize the user input data and identify that user input data as requesting readying of the application 130 or otherwise as a request that is associated with the application 130. Based at least in part on recognizing the user input data as requesting interaction with the application 130, the application interface 128 may send a stop capture command to the first user device 102. The stop capture command may cause the first user device 102 to refrain from capturing audio associated with user utterances or otherwise stop the first user device 102 from acquiring additional user input data until the first user device is configured to utilize the application 130 and/or on-device processing functionality associated with the application 130 as described herein.

At block 308, the application interface 128 may send a readying request to the application 130. For example, the readying request may indicate that the application 130 has been selected and that on-device processing functionality is to be enabled on the device(s) for which the input data was received.

At block 310, the application 130 may send a request for endpoint identifiers to the application interface 128. For example, the request for endpoint identifiers may be utilized to determine the devices that are at issue for a given session of the application 130. For example, one or more first user devices 102, user device 103, and/or other devices may be associated with the readying request at a given time. The request for endpoint identifiers may represent an attempt to determine the number, type, and specific identifiers of the endpoints that may be associated with the session.

At block 312, the application interface 128 may acquire the endpoint identifiers and may send data representing an endpoint list to the application 130. For example, the input data sent from the first user device 102 may indicate an identifier of the first user device 102, an identifier of account data associated with the first user device 102, identifiers of user devices 103 associated with the account data, identifiers of user devices 103 that are in communication with the first user device 102, etc. Some or all of the endpoint identifier data may be queried from the devices at issue and/or from a user registry associated with the first user device 102.

At block 314, the application 130 may send content and on-device processing command(s) to the application interface 128. For example, on-device processing functionality may be determined to be available by the functionality component for the endpoints at issue. A functionality component of the application 130 may call a content component of the application for content associated with the on-device processing functionality. For example, the content component may store data representing content to be utilized when responding to user input utilizing the application. By way of example, if the application at issue is a gaming application, the content component may store content including images to be displayed as part of the game to be played, audio to be output as part of the game, light and/or animation sequences to be output as part of the game, etc. At least a subset of this content may be associated with the on-device processing functionality, while other portions of the content may be associated with the application. When called by the functionality component, the content component may retrieve the subset of the content associated with the on-device processing functionality and may provide the subset of content to the functionality component.

Additionally, the functionality component may call a command generator of the application for data representing one or more commands associated with the on-device processing functionality. For example, the application may be configured to process user input data and to generate commands for the first user device and/or the second user device to perform actions responsive to those user input data. Utilizing the gaming application example, the commands may be to output certain content when certain user input data is received, to display instructions for playing the game, to cause user devices to vibrate at certain portions of the game, etc. As with the content described above, some of these commands may be associated with the on-device processing functionality while other commands may be executed by the remote component(s) of the system other than components of the first user device. The command generator, when called by the functionality component, may send data representing the commands associated with the on-device processing functionality to the functionality component.

At block 316, the application interface 128 may send the content and the on-device processing command(s) to the first user device 102. The application interface 128 may send the content and the on-device processing command(s) to the first user device 102 in the form of configuration data, as described in more detail herein. This configuration data may be sent in the form of a programming language document and in association with a programming language interface. The programming language document may include a JSON file or otherwise a file with the configuration data, and the first user device 102 and/or the second user device 103 may be configured to utilize the programming language document to identify what processes can be performed utilizing on-device processing functionality. In examples, the configuration data itself may be a set of rules, conditional statements, models, and/or other logic for determining what actions to perform when certain user inputs and/or conditions are detected.

At block 318, the first user device 102 may display application features associated with the on-device processing functionality by a user interface of the first user device 102. For example, having received the configuration data for on-device processing functionality, the first user device 102 may determine that at least a portion of that functionality is associated with user input to be received by the first user device 102, such as by a graphical user interface displayed on the first user device 102. In these examples, the on-device processing functionality that is associated with operations performed by the first user device 102 may be displayed on the graphical user interface such that user input may be provided to the display to utilize the on-device processing functionality.

At block 320, the first user device 102 may load the command(s) received from the application interface 128. In this example, at least a portion of the on-device processing functionality may be associated with actions to be performed by the first user device 102, the second user device 103, and/or other devices. The command(s) that were part of the configuration data may be identified as being associated with these actions and may be loaded onto the first user device 102 such that the first user device 102 may be configured to utilize those command(s) when input data associated with the command(s) is received and the on-device processing functionality indicates that the command(s) are to be executed.

At block 322, the first user device 102 may send one or more directives to the second user device 103. In examples, at least a portion of the actions to be performed may be performed by the second user device 103. In these examples, directions indicating the actions to be taken by the second user device 103 may be generated and sent to the second user device 103 to cause the second user device 103 to perform the actions when input data associated with the on-device processing functionality indicates that such actions are to be performed by the second user device 103.

At block 324, the second user device 103 may configure gesture detection on the second user device 103 and/or may configure other user input detection on the second user device 103. In this example, given that the on-device processing functionality has been enabled and the configuration data to perform the on-device processing functionality has been received by the first user device 102, in examples, at least a portion of that functionality may be associated with gesture detection by the second user device 103. In this example, the second user device 103 may be caused to configure such gesture detection while the functionality associated with the application 130 is enabled for use and/or for a given session of the application 130.

FIG. 4 illustrates a sequence diagram of an example process for utilizing on-device processing functionality for enabled trigger events. The operations described with respect to FIG. 4 may be performed in the order shown in FIG. 4 and/or in any other order. Additionally, at least some of the operations may be performed in parallel.

At block 402, a user 350 may provide a gesture and/or otherwise provide user input to a second user device 103. For example, user input data in the form of a user utterance, a gesture, a tactile input, and/or otherwise may be provided by the user to the second user device 103. Such user input may represent an interaction between the user 350 and the second user device 103 and may be associated with the functionality of the application 130.

At block 404, the second user device 103 may detect the gesture and/or otherwise the user input. As described more fully above, an input component of the second user device 103 may be configured to receive user input data corresponding to the user input and may detect a given gesture associated with the user input and/or may detect other attributes of the user input, such as selection of user interface elements.

At block 406, the second user device 103 may send data indicating an application-related event associated with the gesture/user input to a first user device 102. In this example, the input component of the second user device 103 may determine that the user input is associated with the application 130 and is associated with a request to perform an action associated with the application 130.

At block 408, the first user device 102 may identify on-device processing functionality for the event in question. For example, a functionality component of the application may receive an indication that a trigger event has been detected for the application and may determine if on-device processing is available. When on-device processing is available, the functionality component may determine which commands and/or content is associated with on-device processing. In examples, the on-device processing may be associated with commands and/or content that the developer of the application has enabled for such on-device processing. Additionally, or alternatively, the on-device processing functionality may be functionality that does not utilize time sensitive information determinations. For example, a good candidate for on-device processing functionality may be functionality that does not require time sensitive information to be utilized when determining the appropriate response to the user input in question. As such, on-device processing functionality may be appropriate for user requests such as "play Video A," "show me Photograph B," "let's play Game C," etc. However, processing by the remote component(s) of the system 104 utilizing the application 130 may be more appropriate for user requests such as "make a reservation at Restaurant D," "what's the current score of Basketball Game E," and/or other requests where other systems and/or databases are to be called to determine time sensitive information for accurately responding to the user request at issue.

At block 410, in instances where user input is provided to the first user device 102, the user 350 may provide user input to the first user device 102 instead of providing such input to the second user device 103. The processes described with respect to block 410 may be performed in the same or a similar way as the processes described with respect to block 402, except that the user input is provided directly to the first user device 102 instead of being provided to the second user device 103.

At block 412, the first user device 102 may perform on-device processing functionality for the event. For example, an on-device processing component of the first user device 102 may utilize the input data along with the configuration data described herein to determine an action to be performed responsive to the input data and may determine content to be output, command(s) to be utilized, and/or synchronization data to be utilized for performing the action.

At block 414, the first user device 102 may display content on a user interface of the first user device 102. In this example, at least a portion of the actions to be performed responsive to the input data may be the display of content on the user interface of the first user device 102. When this occurs, the on-device processing component may determine a command to cause the content to be displayed as well as the specific content at issue and may cause the display of the first user device 102 to display the content utilizing the determined command.

At block 416 the first user device 102 may send one or more directives to the second user device 103. In examples, at least a portion of the actions to be performed may be performed by the second user device 103. In these examples, directions indicating the actions to be taken by the second user device 103 may be generated and sent to the second user device 103 to cause the second user device 103 to perform the actions when input data associated with the on-device processing functionality indicates that such actions are to be performed by the second user device 103.

At block 418, the second user device 103 may perform one or more actions associated with the directives. For example, the directives may be for the second user device 103 to output audio, to present images, to output light, to vibrate, and/or to perform any other action that the second user device 103 at issue is configured to perform.

FIG. 5 illustrates a sequence diagram of an example process for synchronizing the output of audio with other actions on a device utilizing on-device processing functionality. The operations described with respect to FIG. 5 may be performed in the order shown in FIG. 5 and/or in any other order. Additionally, at least some of the operations may be performed in parallel.

At block 502, an application interface 128 may send content and on-device processing command(s) to a first user device 102. For example, on-device processing functionality may be determined to be available by the functionality component for the endpoints at issue. A functionality component of the application 130 may call a content component of the application for content associated with the on-device processing functionality. For example, the content component may store data representing content to be utilized when responding to user input utilizing the application. By way of example, if the application at issue is a gaming application, the content component may store content including images to be displayed as part of the game to be played, audio to be output as part of the game, light and/or animation sequences to be output as part of the game, etc. At least a subset of this content may be associated with the on-device processing functionality, while other portions of the content may be associated with the processes performed by the application. When called by the functionality component, the content component may retrieve the subset of the content associated with the on-device processing functionality and may provide the subset of content to the functionality component.

Additionally, the functionality component may call a command generator of the application for data representing one or more commands associated with the on-device processing functionality. For example, the application may be configured to process user input data and to generate commands for the first user device and/or the second user device to perform actions responsive to those user input data. Utilizing the gaming application example, the commands may be to output certain content when certain user input data is received, to display instructions for playing the game, to cause user devices to vibrate at certain portions of the game, etc. As with the content described above, some of these commands may be associated with the on-device processing functionality while other commands may be associated with processing performed by the application. The command generator, when called by the functionality component, may send data representing the commands associated with the on-device processing functionality to the functionality component.

At block 504, the first user device 102 may determine when output of audio has started. For example, part of the on-device processing functionality may be to output audio and images in time synchronization such that portions of the audio are output at predetermined times when certain images are output. Time synchronization of audio with performance of other actions may include initially determining when output of the audio in question has started. This may provide a timing indicator of a time when the audio output started and upon which output of the images and/or performance of the other actions may be measured against.

At block 506, the first user device 102 may send a notification of audio output initiation to the application interface 128. In this example, the notification of the audio output initiation may provide the remote component(s) of the system at issue with an indication of the time synchronization processes to be performed by the first user device without necessarily requesting input from the remote component(s) of the system and/or the application at issue to assist in such time synchronization.

At block 508, for individual synchronized actions, the first user device 102 may identify speechmark(s) associated with the audio data. For example, as part of the on-device processing functionality, the first user device 102 may perform time synchronization processes, which may include the identification of the speechmark(s). The speechmark(s) may correspond to identifiers of audio frame of the audio data at issue that are to be associated with performance of the other actions, including, for example, output of certain images.

At block 510, the first user device 102 may determine directive(s) for the speechmark(s). For example, individual ones of the speechmark(s) may be associated with an action to be performed by the first user device 102, such as output of a given image, output of a given light, causing of a vibration, and/or one or more other actions. Individual ones of these actions may be associated with a directive, which may be utilized by the second user device 103 and/or the first user device 102 to actually perform the actions.

At block 512, the first user device 102 may display images associated with the speechmark(s). In this example, the audio output is to be synchronized with display of images, and the speechmark(s) may indicate the images to be output and when those images are to be output based on which audio frames are being output.

At block 514, the first user device 102 may send directive(s) for the speechmark(s) to the second user device 103. In this example, at least a portion of the actions to be performed in time synchronization with output of the audio may be performed by the second user device 103, and as such that directives as described above may be sent to the second user device 103 for performance of the actions when the speechmark(s) indicate(s) such action are to be performed.

At block 516, the first user device 102 may detect an end to audio output. In this example, when the audio output concludes and/or is otherwise ceased, an indication of this audio output cessation may be generated. This may indicate that the command(s) and/or directive(s) to perform the other actions associated with the audio output may also cease being utilized to perform those other actions.

At block 518, the first user device 102 may send a notification indicating cessation of the audio output to the application interface 128. For example, the notification may inform the application interface 128 that the time synchronized output of audio with the one or more other actions has concluded and noting device states of the devices at issue, but may not necessarily request any action on the part of the application 130. By so doing, the on-device processing functionality may initiate, run, and conclude time synchronization of audio output with performance of other actions without necessarily requiring input from the application 130 itself.

Figure 6:
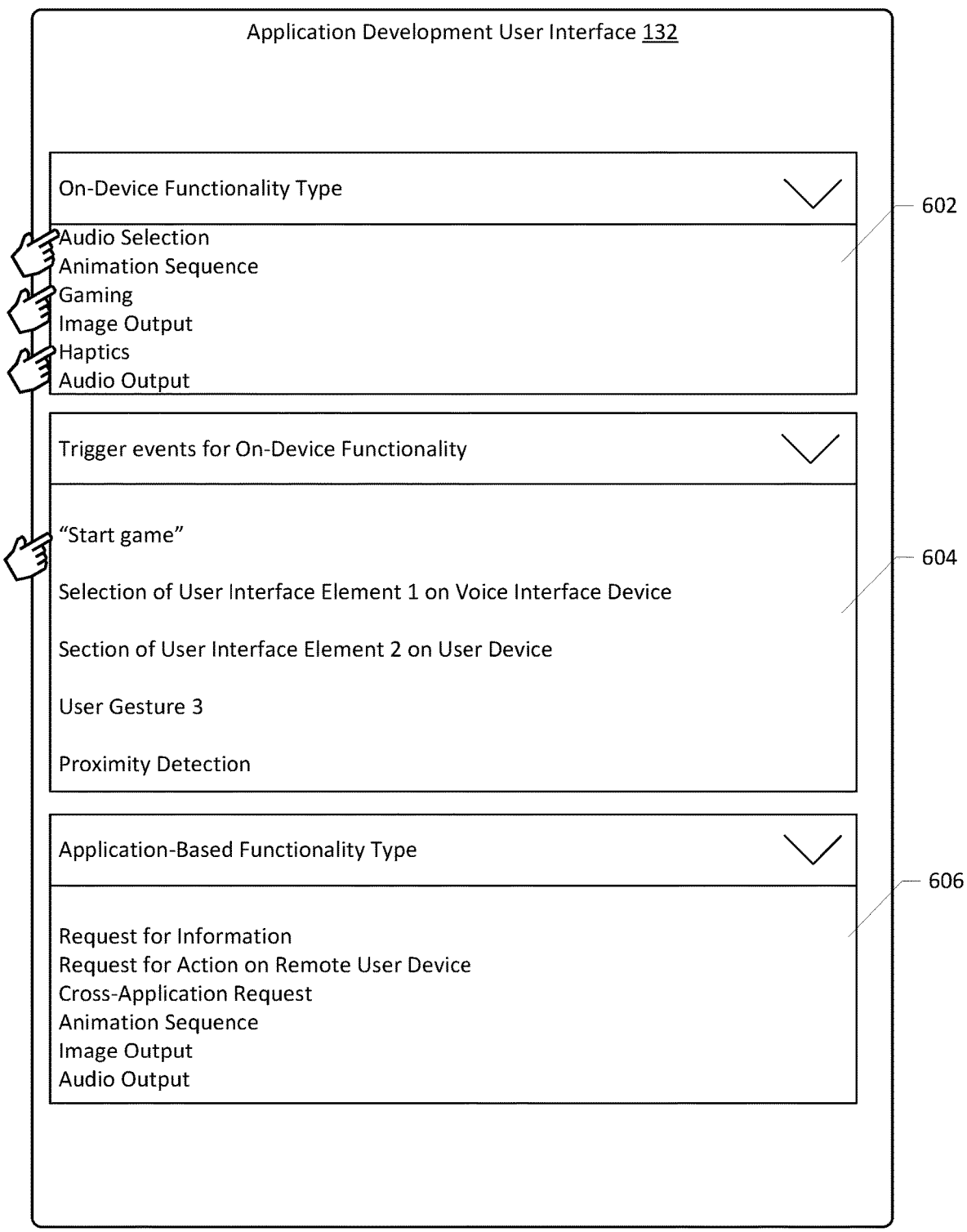
FIG. 6 illustrates an example user interface for the selection and configuration of on-device processing functionality associated with an application.

FIG. 6 illustrates an example user interface for the selection and configuration of on-device processing functionality associated with an application.

For example, as described above, at least a portion of the functionality associated with a given application may be configured to be performed by on-device processing where the device that received the user input in question, and/or an auxiliary device that is in short range communication with the device in question, may utilize on-device processing functionality to process the user input, determine an action to be performed, and cause the action to be performed.

To enable this on-device processing functionality, a developer of the application in question may utilize the application development user interface 132 to provide user input data on which functionalities of the application 130 be configured for on-device processing. To do so, the developer of the application 130 may provide user input data indicating the on-device functionality types 602 to be performed on the devices. In the example of FIG. 6, the on-device functionality types 602 are illustrated as "audio selection," "animation sequence," "gaming," "image output," "haptics," and "audio output." It should be understood that these on-device functionality types 602 are provided by way of nonlimiting example, and other on-device functionality types 602 are included in this disclosure. As shown in FIG. 6, the developer has selected audio selection, gaming, and haptics as functionality types to be performed utilizing on-device processing as described herein.

The user interface may also display options for trigger events 604 associated with the on-device functionality. The trigger events 604 may be based at least in part on the on-device functionality types 602 that were selected, with some trigger events 604 being relevant to certain on-device functionality types 602 while other trigger events 604 may be relevant to application-based functionality types 606. In the example of FIG. 6, the trigger events are illustrated as a voice command of "start game," selection of User Interface Element 1 on a first user device, selection of User Interface Element 2 on a second user device, User Gesture 3, and proximity detection. It should be understood that these trigger events 604 are nonlimiting examples and any trigger events 604 may be provided for selection utilizing the application development user interface 132. By way of example, the user input data by the developer may indicate that an animation sequence is to be performed by the second user device when selection of a given user interface element displayed on the first user device occurs. Other example actions may include output of certain content when certain user gestures are detected, causing the second user device to vibrate when certain images are displayed on the first user device, causing the second user device to light up at certain points of a game, etc. The application development user interface 132 may utilize these user input data from the developer to determine what command(s) are to be utilized by the first user device and/or the second user device to perform the indicated action as well as content that is to be utilized by the first user device and/or the second user device to perform the action.

The functionalities of the application that are not selected for on-device processing and/or that are indicated as not available for on-device processing may be listed in the application-based functionality types 606. Note that in the example of FIG. 6, the on-device functionality types 602 that were not selected may by default or otherwise be included in the application-based functionality types 606.

Figure 8:
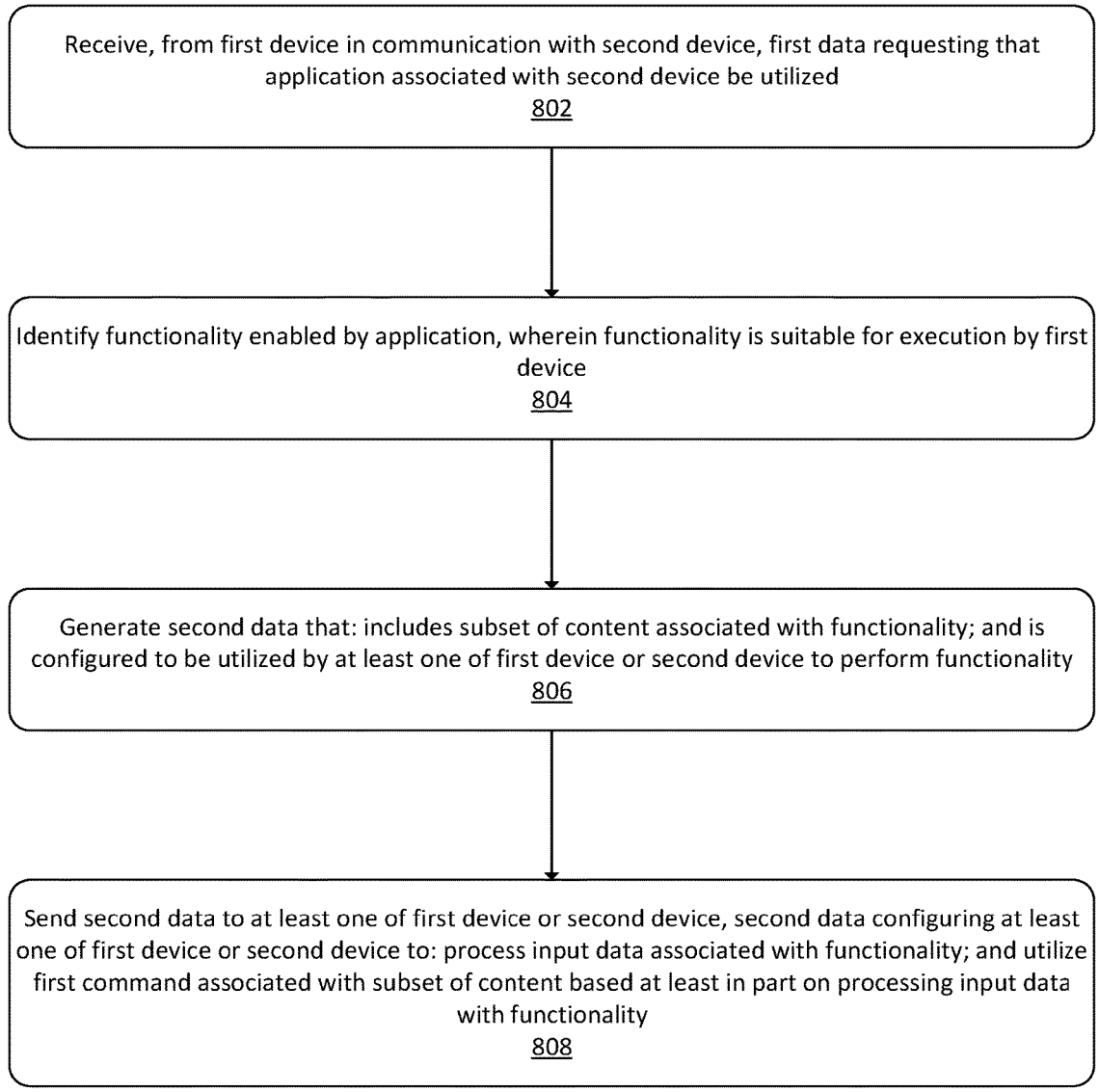
FIG. 8 illustrates a flow diagram of another example process for selective on-device latency reduction.

FIGS. 7 and 8 illustrates processes for selective on-device latency reduction. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for selective on-device latency reduction. The order in which the operations or steps are described is not intended to be construed as a limitation, and any number of the described operations may be combined in any order and/or in parallel to implement process 700.

At block 702, the process 700 may include receiving, from a first user device in communication with a second user device, first data requesting that an application associated with the second user device be readied for processing requests from the first user device. For example, a input component of a first user device and/or a second user device may receive user input data or otherwise receive contextual data indicating that a trigger event has occurred in association with one or more applications. These trigger events may indicate that a given application will be utilized. Such trigger events may include, for example, receiving user input data requesting that the application be readied or otherwise initiated for use, determining that historical data indicates the application will be used at a certain time and/or day, detecting an environmental condition in an environment where the first user device and/or the second user device are disposed such as detection of user presence, detection of a particular user, detection of the second user device in proximity to the first user device, etc. It should be understood that the trigger events provided herein are provided by way of nonlimiting example, and any trigger events that indicate interaction with a given application may be utilized. The input component may utilize the data described above to determine that a trigger event has occurred and/or the input component may be configured to receive the data described above and send that data to the remote component(s) of the system. In these examples, an application interface may receive the data from the input component and may perform operations to determine that a readied indication or otherwise a trigger event associated with a given application has occurred. When such a trigger event is detected, the application interface may determine the application to be utilized and may determine if the application has been enabled for on-device processing functionality.

At block 704, the process 700 may include determining that the application has been configured to send a first command to the first user device that causes the first user device to respond to the requests. For example, a functionality component of the application may receive an indication that a trigger event has been detected for the application and may determine if on-device processing functionality is available. When on-device processing functionality is available, the functionality component may determine which commands and/or content is enabled for on-device processing. In examples, the on-device processing functionality may be functionality that the developer of the application has enabled for such on-device processing functionality. Additionally, or alternatively, the on-device processing functionality may be functionality that does not utilize time sensitive information determinations. For example, a good candidate for on-device processing functionality may be functionality that does not require time sensitive information to be utilized when determining the appropriate response to the user input in question. As such, on-device processing functionality may be appropriate for user requests such as "play Video A," "show me Photograph B," "let's play Game C," etc. However, functionality performed by the application may be more appropriate for user requests such as "make a reservation at Restaurant D," "what's the current score of Basketball Game E," and/or other requests where other systems and/or databases are to be called to determine time sensitive information for accurately responding to the user request at issue.

At block 706, the process 700 may include, in response to the application being configured to send the first command, generating second data that: includes a subset of content associated with the first command, the application associated with additional content that differs from the subset of content; and is configured to be utilized by the first user device to utilize the first command and the subset of content to respond to the requests. For example, the content component may store data representing content to be utilized when responding to user input utilizing the application. By way of example, if the application at issue is a gaming application, the content component may store content including images to be displayed as part of the game to be played, audio to be output as part of the game, light and/or animation sequences to be output as part of the game, etc. At least a subset of this content may be associated with the on-device processing functionality, while other portions of the content may be associated with the functionality performed by remote component(s) of the system. When called by the functionality component, the content component may retrieve the subset of the content associated with the on-device processing functionality and may provide the subset of content to the functionality component.

Additionally, the functionality component may call a command generator of the application for data representing one or more commands associated with the on-device processing functionality. For example, the application may be configured to process user input data and to generate commands for the first user device and/or the second user device to perform actions responsive to those user input data. Utilizing the gaming application example, the commands may be to output certain content when certain user input data is received, to display instructions for playing the game, to cause user devices to vibrate at certain portions of the game, etc. As with the content described above, some of these commands may be associated with the on-device processing functionality. The command generator, when called by the functionality component, may send data representing the commands associated with the on-device processing functionality to the functionality component.

At block 708, the process 700 may include sending the second data to the first user device such that the first user device is enabled to utilize the second data for: processing user input data associated with the first command; and sending a directive associated with the subset of content to the second user device based at least in part on processing the user input data utilizing the first command. For example, the second data may be considered configuration data as described above and may be sent to the first user device such that an on-device processing component of the first user device may store and utilize the configuration data for processing user input data on the first user device and/or on the second user device, and without requesting that the application-based processing functionality be utilized.

Additionally, or alternatively, the process 700 may include, in response to receiving the first data, determining the first command that is configured to cause the first user device to respond to the requests, the first command differing from a second command configured to cause the application to respond to the requests instead of the first user device. The process 700 may also include identifying the subset of content associated with the first command.

Additionally, or alternatively, the process 700 may include determining that a first portion of the subset of content includes audio data. The process 700 may also include determining that a second portion of the subset of content includes at least image data to be output in time synchronization with the audio data. The process 700 may also include generating third data that associates frames of the image data with portions of the audio data such that the portions of the audio data are output when the image data is utilized to display corresponding images. The process 700 may also include sending the third data to the first user device such that the first user device is enabled to cause audio corresponding to the audio data to be output in time synchronization with the corresponding images.

Additionally, or alternatively, the process 700 may include sending, utilizing an application development user interface: third data indicating selection of the first command to be utilized by the first user device; fourth data indicating first trigger events that, when detected by the first user device, cause the first user device to utilize the first command; fifth data indicating a second command to be utilized by the application; and sixth data indicating second trigger events that, when detected by the first user device, cause the first user device to send an indicator of the second trigger events to the application for utilizing the second command. The process 700 may also include receiving, utilizing the application development user interface, seventh data confirming that the application has been configured to send the first command to the first user device that causes the first user device to respond to the requests.

FIG. 8 illustrates a flow diagram of another example process for selective on-device latency reduction. The order in which the operations or steps are described is not intended to be construed as a limitation, and any number of the described operations may be combined in any order and/or in parallel to implement process 800.

At block 802, the process 800 may include receiving, from a first device in communication with a second device, first data requesting that an application associated with the second device be utilized. For example, a input component of a first user device and/or a second user device may receive user input data or otherwise receive contextual data indicating that a trigger event has occurred in association with one or more applications. These trigger events may indicate that a given application will be utilized. Such trigger events may include, for example, receiving user input data requesting that the application be readied or otherwise initiated for use, determining that historical data indicates the application will be used at a certain time and/or day, detecting an environmental condition in an environment where the first user device and/or the second user device are disposed such as detection of user presence, detection of a particular user, detection of the second user device in proximity to the first user device, etc. It should be understood that the trigger events provided herein are provided by way of nonlimiting example, and any trigger events that indicate interaction with a given application may be utilized. The input component may utilize the data described above to determine that a trigger event has occurred and/or the input component may be configured to receive the data described above and send that data to the remote component(s) of the system. In these examples, an application interface may receive the data from the input component and may perform operations to determine that a readied indication or otherwise a trigger event associated with a given application has occurred. When such a trigger event is detected, the application interface may determine the application to be utilized and may determine if the application has been enabled for on-device processing functionality.

At block 804, the process 800 may include identifying functionality enabled by the application, wherein the functionality is suitable for execution by the first device. For example, a functionality component of the application may receive an indication that a trigger event has been detected for the application and may determine if on-device processing functionality is available. When on-device processing functionality is available, the functionality component may determine which functionality is enabled for on-device processing. In examples, the on-device processing functionality may be the functionality that the developer of the application has enabled for such on-device processing functionality. Additionally, or alternatively, the on-device processing functionality may be functionality that does not utilize time sensitive information determinations. For example, a good candidate for on-device processing functionality may be functionality that does not require time sensitive information to be utilized when determining the appropriate response to the user input in question. As such, on-device processing functionality may be appropriate for user requests such as "play Video A," "show me Photograph B," "let's play Game C," etc. However, application-based processing functionality may be more appropriate for user requests such as "make a reservation at Restaurant D," "what's the current score of Basketball Game E," and/or other requests where other systems and/or databases are to be called to determine time sensitive information for accurately responding to the user request at issue.

At block 806, the process 800 may include generating second data that: includes a subset of content associated with the functionality; and is configured to be utilized by at least one of the first device or the second device to perform the functionality. For example, once the on-device processing functionality is determined by the functionality component, the functionality component may call a content component of the application for content associated with the on-device processing functionality. For example, the content component may store data representing content to be utilized when responding to user input utilizing the application. By way of example, if the application at issue is a gaming application, the content component may store content including images to be displayed as part of the game to be played, audio to be output as part of the game, light and/or animation sequences to be output as part of the game, etc. At least a subset of this content may be associated with the on-device processing functionality, while other portions of the content may be associated with the application-based processing functionality. When called by the functionality component, the content component may retrieve the subset of the content associated with the on-device processing functionality and may provide the subset of content to the functionality component.

Additionally, the functionality component may call a command generator of the application for data representing one or more commands associated with the on-device processing functionality. For example, the application may be configured to process user input data and to generate commands for the first user device and/or the second user device to perform actions responsive to those user input data. Utilizing the gaming application example, the commands may be to output certain content when certain user input data is received, to display instructions for playing the game, to cause user devices to vibrate at certain portions of the game, etc. As with the content described above, some of these commands may be associated with the on-device processing functionality while other commands may be associated with the application-based processing functionality. The command generator, when called by the functionality component, may send data representing the commands associated with the on-device processing functionality to the functionality component.

At block 808, the process 800 may include sending the second data to the at least one of the first device or the second device, the second data configuring the at least one of the first device or the second device to: process input data associated with the functionality; and utilize a first command associated with the subset of content based at least in part on processing the input data with the functionality. For example, the second data may be considered configuration data as described above and may be sent to the first user device such that an on-device processing component of the first user device may store and utilize the configuration data for processing user input data on the first user device and/or on the second user device, and without requesting that the application-based processing functionality be utilized.

Additionally, or alternatively, the process 800 may include, based at least in part on receiving the first data, determining the first command that is configured to cause the first device to execute the functionality, the first command differing from a second command configured to cause the application to respond to requests instead of the first user device. The process 800 may also include identifying the subset of content associated with the first command.

Additionally, or alternatively, the process 800 may include determining that a first portion of the subset of content is audible. The process 800 may also include determining that a second portion of the subset of content is viewable to be output in time synchronization with the first portion. The process 800 may also include generating third data that associates the first portion and the second portion such that the first portion is output when the second portion is utilized. The process 800 may also include sending the third data to the at least one of the first device or the second device such that the at least one of the first device or the second device is enabled to cause the first portion to be output in time synchronization with the second portion.

Additionally, or alternatively, the process 800 may include sending: third data indicating the functionality to be executed by the at least one of the first device or the second device; and fourth data indicating trigger events that, when detected by the at least one of the first device or the second device, cause the at least one of the first device or the second device to execute the functionality. The process 800 may also include receiving fifth data confirming that the functionality has been enabled by the application.

Additionally, or alternatively, the process 800 may include receiving, from the at least one of the first device or the second device, an indication that contextual information is requested to determine a response utilizing the functionality. The process 800 may also include determining the contextual information based at least in part on the indication, the contextual information differing from the second data sent to the at least one of the first device or the second device. The process 800 may also include sending the contextual information to the at least one of the first device or the second device.

Additionally, or alternatively, the process 800 may include determining the first command associated with the functionality, the first command determined from a group of commands configured to be utilized by the application. The process 800 may also include determining a second command that differs from the first command and is unassociated with the functionality, the group of commands including the second command. The process 800 may also include storing the second command in association with the application such that the application executes the second command instead of the first device executing the second command.

Additionally, or alternatively, the process 800 may include receiving third data indicating that the at least one of the first device or the second device has executed the functionality. The process 800 may also include determining fourth data indicating a state change associated with the second device caused by the functionality being executed. The process 800 may also include generating fifth data associating the state change with the second device.

Additionally, or alternatively, the process 800 may include determining that the subset of content has changed to alternate content after the second data was sent to the at least one of the first device or the second device. The process 800 may also include generating third data including the alternate content and a second command associated with the alternate content. The process 800 may also include sending the third data to the at least one of the first device or the second device, the third data configured to be utilized by the at least one of the first device or the second device instead of the at least a portion of the second data.

Figure 9:
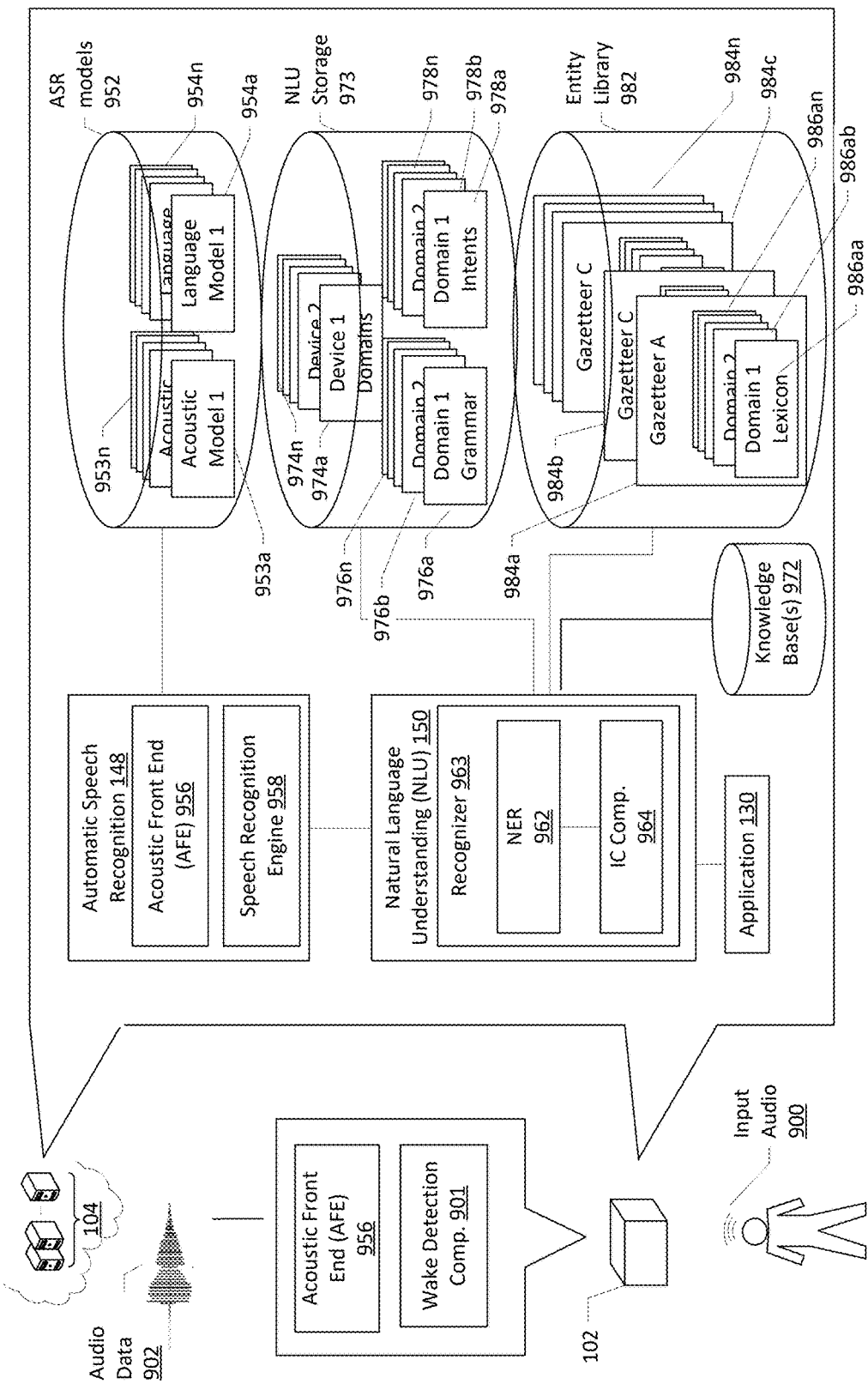
FIG. 9 illustrates a conceptual diagram of components of a speech-processing system for processing audio data provided by one or more devices.

FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin processing audio data). The various components illustrated may be located on a same device or different physical devices. Message between various components illustrated in FIG. 9 may occur directly or across a network 106. An audio capture component, such as a microphone 114 of the device 102, or another device, captures audio 900 corresponding to a spoken utterance. The device 102, using a wake word engine 901, then processes audio data corresponding to the audio 900 to determine if a keyword (such as a wakeword) is detected in the audio data. Following detection of a wakeword, the device 102 processes audio data 902 corresponding to the utterance utilizing an ASR component 148. The audio data 902 may be output from an optional acoustic front end (AFE) 956 located on the device prior to transmission. In other instances, the audio data 902 may be in a different form for processing by a remote AFE 956, such as the AFE 956 located with the ASR component 148. In examples, any of the processes described with respect to the device 102 may be performed by the second user device 103 from FIG. 1.

The wake word engine 901 works in conjunction with other components of the user device, for example a microphone to detect keywords in audio 900. For example, the device may convert audio 900 into audio data, and process the audio data with the wake word engine 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake word engine 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search for the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN or by using RNN. Following-on posterior threshold tuning or smoothing is applied for decision making. Other techniques for wakeword detection, such as those known in the art, may also be used.

Once the wakeword is detected, the local device 102 may "wake." The audio data 902 may include data corresponding to the wakeword. Further, a local device may "wake" upon detection of speech/spoken audio above a threshold, as described herein. An ASR component 148 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 148 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956).

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what time is the pool open until" The wake detection component may identify the wake word, otherwise described as a trigger expression, "Alexa," in the user utterance and may "wake" based on identifying the wake word. The speech recognition engine 958 may identify, determine, and/or generate text data corresponding to the user utterance, here "what time is the pool open until."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be utilized, for natural language understanding (NLU) processing, such as conversion of the text into commands for execution, by the user device and/or by another device (such as a server running a specific application like a search engine, etc.).

The device performing NLU processing 150 may include various components, including potentially dedicated processor(s), memory, storage, etc. As shown in FIG. 9, an NLU component 150 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 148 based on the utterance input audio 900) and attempts to make a semantic interpretation of the text. That is, the NLU process determines the meaning behind the text based on the individual words and then implements that meaning. NLU processing 150 interprets a text string to derive an intent or a desired action from the user as well as the pertinent pieces of information in the text that allow a device (e.g., device 102) to complete that action. For example, if a spoken utterance is processed using ASR 148 and outputs the text "what time is the pool open until?" the NLU process may determine that the user intended to receive a response to the voice command indicating a time when the pool of the enterprise entity closes.

The NLU 150 may process several textual inputs related to the same utterance. For example, if the ASR 148 outputs N text segments (as part of an N-best list), the NLU may process all N outputs to obtain NLU results.

As will be discussed further below, the NLU process may be configured to parse and tag to annotate text as part of NLU processing. For example, for the text "what time is the pool open until?" "what time" may be tagged as a command (to determine a time to respond to the user with).

To correctly perform NLU processing of speech input, an NLU process 150 may be configured to determine a "domain" of the utterance so as to determine and narrow down which services offered by the endpoint device may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," "health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, a communications intent database may link words and phrases such as "identify song," "song title," "determine song," to a "song title" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "purchase" is an identified intent, a grammar (976) framework or frameworks may correspond to sentence structures such as "purchase item called 'Item A' from Marketplace A."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 130. The destination application 130 may be determined based on the NLU output. For example, if the NLU output includes a command to send a message, the destination application 130 may be a message sending application, such as one located on the user device or in a message sending appliance, configured to execute a message sending command. If the NLU output includes a search request, the destination application may include a search engine processor, such as one located on a search server, configured to execute a search command. After the appropriate command is generated based on the intent of the user, the destination application 130 may provide some or all of this information to a text-to-speech (TTS) engine. The TTS engine may then generate an actual audio file for outputting the audio data determined by the application (e.g., "okay," or "the pool closes at 10:00 pm").

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 150 during runtime operations where NLU operations are performed on text (such as text output from an ASR component 148). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, device 102 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the system 124, as illustrated herein are exemplary, and may be located in a stand-alone device or may be included, in whole or in part, as a component of a larger device or system, may be distributed across a network or multiple devices connected by a network, etc.

Figure 10:
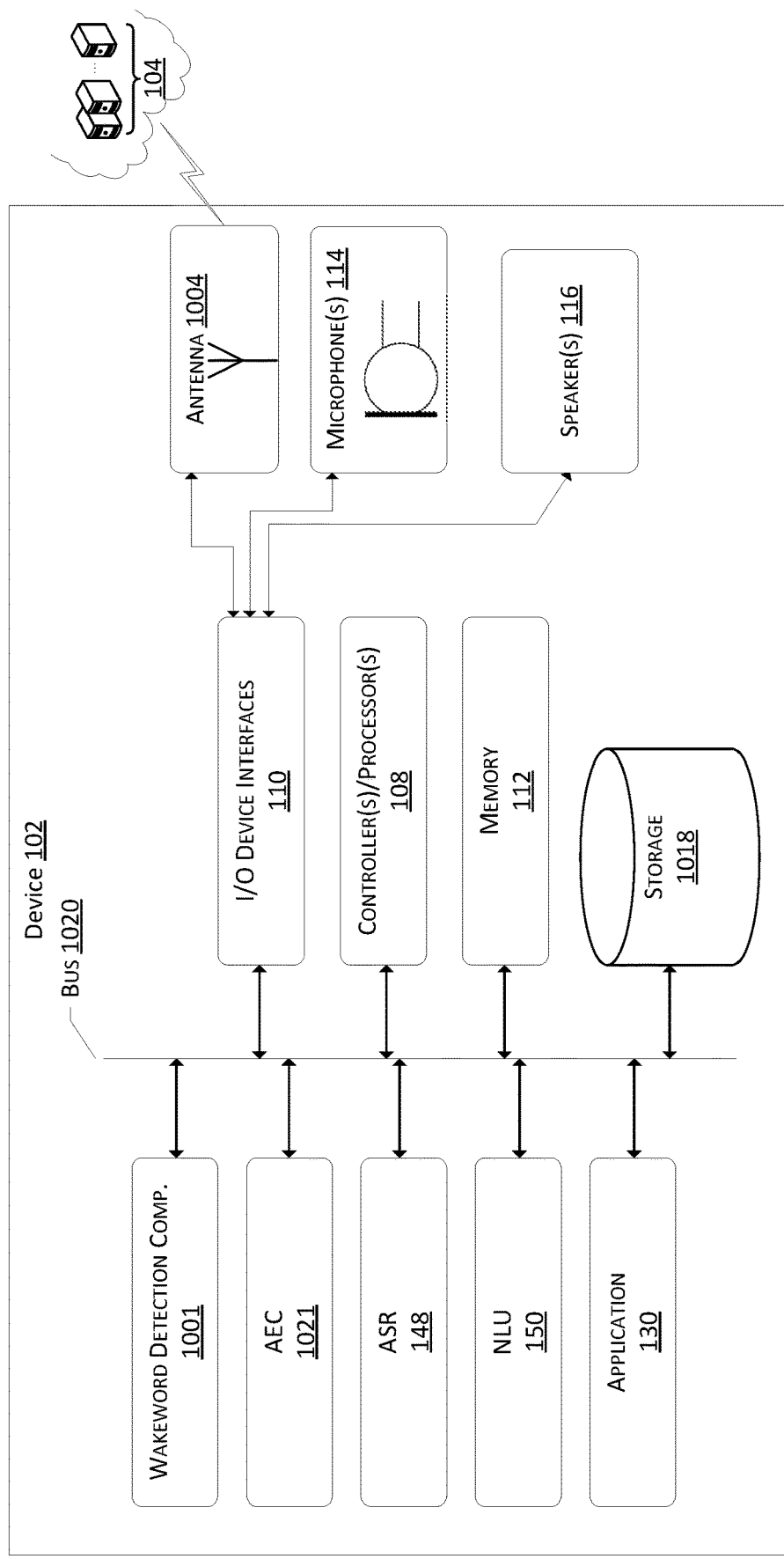
FIG. 10 illustrates a conceptual diagram of components of an example device that may utilized in association with enterprise type models for voice interfaces.

FIG. 10 illustrates a conceptual diagram of components of an example connected device from which sensor data may be received for device functionality control utilizing activity prediction. For example, the device may include one or more electronic devices such as first user devices (e.g., smart speaker devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 114, a power source, and functionality for sending generated audio data via one or more antennas 1004 to another device and/or system. It should be understood that the processes described with respect to device 102 may be performed by the user device 103 from FIG. 1.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 114, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 108, that may include a central processing unit (CPU) for processing data and computer-readable instructions, and memory 112 for storing data and instructions of the device 102. In examples, the skills and/or applications described herein may be stored in association with the memory 112, which may be queried for content and/or responses as described herein. The device 102 may also be connected to removable or external non-volatile memory and/or storage, such as a removable memory card, memory key drive, networked storage, etc., through input/output device interfaces 110.

Computer instructions for operating the device 102 and its various components may be executed by the device's controller(s)/processor(s) 108, using the memory 112 as "working" storage at runtime. A device's computer instructions may be stored in a non-transitory manner in non-volatile memory 112, storage 1018, or an external device(s). Alternatively, some or all of the executable instructions may be embedded in hardware or firmware on the device 102 in addition to or instead of software.

The device 102 may include input/output device interfaces 110. A variety of components may be connected through the input/output device interfaces 110. Additionally, the device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 108 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 110 that connect to a variety of components. This wired or a wireless audio and/or video port may allow for input/output of audio/video to/from the device 102. The device 102 may also include an audio capture component. The audio capture component may be, for example, a microphone 114 or array of microphones, a wired headset or a wireless headset, etc. The microphone 114 may be configured to capture audio. If an array of microphones is included, approximate distance to a sound's point of origin may be determined using acoustic localization based on time and amplitude differences between sounds captured by different microphones of the array. The device 102 (using microphone 114, wakeword detection component 1001, ASR component 148, etc.) may be configured to generate audio data corresponding to captured audio. The device 102 (using input/output device interfaces 110, antenna 1004, etc.) may also be configured to transmit the audio data to the system 104 for further processing or to process the data using internal components such as a wakeword detection component 1001.

Via the antenna(s) 1004, the input/output device interface 110 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the system 104 may include an ASR component 148. The ASR component 148 of device 102 may be of limited or extended capabilities. The ASR component 148 may include language models stored in ASR model storage component, and an ASR component 148 that performs automatic speech recognition. If limited speech recognition is included, the ASR component 148 may be configured to identify a limited number of words, such as keywords detected by the device, whereas extended speech recognition may be configured to recognize a much larger range of words.

The device 102 and/or the system 104 may include a limited or extended NLU component 150. The NLU component 150 of device 102 may be of limited or extended capabilities. The NLU component 150 may comprise a name entity recognition module, an intent classification module and/or other components. The NLU component 150 may also include a stored knowledge base and/or entity library, or those storages may be separately located.

In examples, AEC may also be performed by the device 102. In these examples, the operations may include causing the AEC component 1021 to be enabled or otherwise turned on, or the operations may include causing the AEC component 1021 to transition from a first mode to a second mode representing a higher sensitivity to audio data generated by the microphone 114. The AEC component 1021 may utilize the audio data generated by the microphone 114 to determine if an audio fingerprint of the audio data, or portion thereof, corresponds to a reference audio fingerprint associated with the predefined event.

The device 102 and/or the system 104 may also include an application 130 that is configured to execute commands/functions associated with a spoken command as described herein. The device 102 may include a wakeword detection component 901, which may be a separate component or may be included in an ASR component 148. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a first user device in communication with a second user device, first data requesting that an application associated with the second user device be readied for processing requests from the first user device;
determining that the application has been configured to send a first command to the first user device that causes the first user device to respond to the requests;
in response to the application being configured to send the first command, generating second data that:
includes a subset of content associated with the first command, the application associated with additional content that differs from the subset of content; and
is configured to be utilized by the first user device to utilize the first command and the subset of content to respond to the requests; and
sending the second data to the first user device such that the first user device is enabled to utilize the second data for:
processing user input data associated with the first command; and
sending a directive associated with the subset of content to the second user device based at least in part on processing the user input data utilizing the first command.

2. The system of claim 1, the operations further comprising:
in response to receiving the first data, determining the first command that is configured to cause the first user device to respond to the requests, the first command differing from a second command configured to cause the application to respond to the requests instead of the first user device; and
identifying the subset of content associated with the first command.

3. The system of claim 1, the operations further comprising:
determining that a first portion of the subset of content includes audio data;
determining that a second portion of the subset of content includes at least image data to be output in time synchronization with the audio data;
generating third data that associates frames of the image data with portions of the audio data such that the portions of the audio data are output when the image data is utilized to display corresponding images; and sending the third data to the first user device such that the first user device is enabled to cause audio corresponding to the audio data to be output in time synchronization with the corresponding images.

4. The system of claim 1, the operations further comprising:
sending, utilizing an application development user interface:
third data indicating selection of the first command to be utilized by the first user device;
fourth data indicating first trigger events that, when detected by the first user device, cause the first user device to utilize the first command;
fifth data indicating a second command to be utilized by the application; and
sixth data indicating second trigger events that, when detected by the first user device, cause the first user device to send an indicator of the second trigger events to the application for utilizing the second command; and
receiving, utilizing the application development user interface, seventh data confirming that the application has been configured to send the first command to the first user device that causes the first user device to respond to the requests.

5. A method, comprising:
receiving, from a first device in communication with a second device, first data requesting that an application associated with the second device being utilized;
identifying functionality enabled by the application, wherein the functionality is suitable for execution by the first device;
generating second data that:
includes a subset of content associated with the functionality; and
is configured to be utilized by at least one of the first device or the second device to perform the functionality; and
sending the second data to the at least one of the first device or the second device, the second data configuring the at least one of the first device or the second device to:
process input data associated with the functionality; and
utilize a first command associated with the subset of content based at least in part on processing the input data with the functionality.

6. The method of claim 5, further comprising:
based at least in part on receiving the first data, determining the first command that is configured to cause the first device to execute the functionality, the first command differing from a second command configured to cause the application to respond to requests instead of the first device; and
identifying the subset of content associated with the first command.

7. The method of claim 5, further comprising:
determining that a first portion of the subset of content is audible;
determining that a second portion of the subset of content is viewable to be output in time synchronization with the first portion;
generating third data that associates the first portion and the second portion such that the first portion is output when the second portion is utilized; and
sending the third data to the at least one of the first device or the second device such that the at least one of the first device or the second device is enabled to cause the first portion to be output in time synchronization with the second portion.

8. The method of claim 5, further comprising:
sending:
third data indicating the functionality to be executed by the at least one of the first device or the second device; and
fourth data indicating trigger events that, when detected by the at least one of the first device or the second device, cause the at least one of the first device or the second device to execute the functionality; and
receiving fifth data confirming that the functionality has been enabled by the application.

9. The method of claim 5, further comprising:
receiving, from the at least one of the first device or the second device, an indication that contextual information is requested to determine a response utilizing the functionality;
determining the contextual information based at least in part on the indication, the contextual information differing from the second data sent to the at least one of the first device or the second device; and
sending the contextual information to the at least one of the first device or the second device.

10. The method of claim 5, further comprising:
determining the first command associated with the functionality, the first command determined from a group of commands configured to be utilized by the application;
determining a second command that differs from the first command and is unassociated with the functionality, the group of commands including the second command; and
storing the second command in association with the application such that the application executes the second command instead of the first device executing the second command.

11. The method of claim 5, further comprising:
receiving third data indicating that the at least one of the first device or the second device has executed the functionality;
determining fourth data indicating a state change associated with the second device caused by the functionality being executed; and
generating fifth data associating the state change with the second device.

12. The method of claim 5, further comprising:
determining that the subset of content has changed to alternate content after the second data was sent to the at least one of the first device or the second device;
generating third data including the alternate content and a second command associated with the alternate content; and
sending the third data to the at least one of the first device or the second device, the third data configured to be utilized by the at least one of the first device or the second device instead of the at least a portion of the second data.

13. A system, comprising:
one or more processors; and
non-transitory computer-readable media storing computer-executable instructions that, when executed by the one or more processors, cause the one or more processors to perform operations comprising:
receiving, from a first device in communication with a second device, first data requesting that an application associated with the second device be utilized;

identifying functionality enabled by the application, wherein the functionality is suitable for execution by the first device;

generating second data that:
- includes a subset of content associated with the functionality; and
- is configured to be utilized by at least one of the first device or the second device to perform the functionality; and sending the second data to the at least one of the first device or the second device, the second data configuring the at least one of the first device or the second device to:
- process input data associated with the functionality; and
- utilize a first command associated with the subset of content based at least in part on processing the input data with the functionality.

14. The system of claim 13, the operations further comprising:
based at least in part on receiving the first data, determining the first command that is configured to cause the first device to execute the functionality, the first command differing from a second command configured to cause the application to respond to requests instead of the first device; and
identifying the subset of content associated with the first command.

15. The system of claim 13, the operations further comprising:
determining that a first portion of the subset of content is audible;
determining that a second portion of the subset of content is viewable to be output in time synchronization with the first portion;
generating third data that associates the first portion and the second portion such that the first portion is output when the second portion is utilized; and
sending the third data to the at least one of the first device or the second device such that the at least one of the first device or the second device is enabled to cause the first portion to be output in time synchronization with the second portion.

16. The system of claim 13, the operations further comprising:
sending:
- third data indicating the functionality to be executed by the at least one of the first device or the second device; and
- fourth data indicating first trigger events that, when detected by the at least one of the first device or the second device, cause the at least one of the first device or the second device to execute the functionality; and
receiving fifth data confirming that the functionality has been enabled by the application.

17. The system of claim 13, the operations further comprising:
receiving, from the at least one of the first device or the second device, an indication that contextual information is requested to determine a response utilizing the functionality;
determining the contextual information based at least in part on the indication, the contextual information differing from the second data sent to the at least one of the first device or the second device; and
sending the contextual information to the at least one of the first device or the second device.

18. The system of claim 13, the operations further comprising:
determining the first command associated with the functionality, the first command determined from a group of commands configured to be utilized by the application;
determining a second command that differs from the first command and is unassociated with the functionality, the group of commands including the second command; and
storing the second command in association with the application such that the application executes the second command instead of the first device executing the second command.

19. The system of claim 13, the operations further comprising:
receiving third data indicating that the at least one of the first device or the second device has executed the functionality;
determining fourth data indicating a state change associated with the second device caused by the functionality being executed; and
generating fifth data associating the state change with the second device.

20. The system of claim 13, the operations further comprising:
determining that the subset of content has changed to alternate content since the second data was sent to the at least one of the first device or the second device;
generating third data including the alternate content and a second command associated with the alternate content; and
sending the third data to the at least one of the first device or the second device.

* * * * *